United States Patent
Patil et al.

(10) Patent No.: US 10,640,645 B2
(45) Date of Patent: May 5, 2020

(54) POLYISOINDOLINONE COMPOSITIONS, METHODS OF MANUFACTURE, AND COMPOSITIONS AND ARTICLES FORMED THEREFROM

(71) Applicant: SABIC GLOBAL TECHNOLOGIES B.V., Bergen op Zoom (NL)

(72) Inventors: Dadasaheb V. Patil, Mount Vernon, IN (US); Prakash Sista, Mount Vernon, IN (US); Robert Russell Gallucci, Mount Vernon, IN (US)

(73) Assignee: SABIC GLOBAL TECHNOLOGIES, Bergen op Zoom (NL)

( * ) Notice: Subject to any disclaimer, the term of this patent is extended or adjusted under 35 U.S.C. 154(b) by 75 days.

(21) Appl. No.: 16/093,282

(22) PCT Filed: Apr. 14, 2017

(86) PCT No.: PCT/US2017/027579
§ 371 (c)(1),
(2) Date: Oct. 12, 2018

(87) PCT Pub. No.: WO2017/180972
PCT Pub. Date: Oct. 19, 2017

(65) Prior Publication Data
US 2019/0127575 A1 May 2, 2019

Related U.S. Application Data

(60) Provisional application No. 62/323,265, filed on Apr. 15, 2016.

(51) Int. Cl.
| | |
|---|---|
| *C08L 71/00* | (2006.01) |
| *C08G 65/40* | (2006.01) |
| *B29C 48/02* | (2019.01) |
| *B29C 45/00* | (2006.01) |
| *B29C 48/00* | (2019.01) |
| *B29K 105/06* | (2006.01) |

(52) U.S. Cl.
CPC .......... *C08L 71/00* (2013.01); *B29C 45/0001* (2013.01); *B29C 48/022* (2019.02); *C08G 65/405* (2013.01); *C08G 65/4031* (2013.01); *C08G 65/4037* (2013.01); *C08G 65/4043* (2013.01); *B29K 2105/06* (2013.01); *C08G 2650/40* (2013.01)

(58) Field of Classification Search
CPC ... C08L 71/00; C08G 65/4037; C08G 65/406; C08G 65/4031; C08G 65/4043; C08G 2650/40; B29C 48/022; B29C 45/0001; B29K 2105/06
USPC ...................................................... 524/538
See application file for complete search history.

(56) References Cited

U.S. PATENT DOCUMENTS

| | | |
|---|---|---|
| 5,254,663 A | 10/1993 | Hay |
| 2005/0222334 A1 | 10/2005 | Srinivasan et al. |
| 2007/0219344 A1* | 9/2007 | Steiger .................. C08G 75/23 528/373 |
| 2010/0113688 A1 | 5/2010 | Hsu et al. |

(Continued)

FOREIGN PATENT DOCUMENTS

EP 2155820 A1 11/2008

OTHER PUBLICATIONS

International Search Report; International Application No. PCT/US2017/026903; International Filing Date—Apr. 11, 2017; dated Jun. 30, 2017; 6 pages. (SS230004PCT).

(Continued)

*Primary Examiner* — Michael Bernshteyn
(74) *Attorney, Agent, or Firm* — Cantor Colburn LLP

(57) ABSTRACT

A polymer composition that includes, based on the total weight of the polymers: 1-99 weight percent, of a polymer component comprising a polyarylether ketone, a polybenzimdazole, a polyimide, a poly(aryl ether sulfone), a poly(phenylene sulfide), or a combination comprising at least one of the foregoing; and 1-99 weight percent, of a polyisoindolinone, wherein the polyisoindolinone comprises: 1-100 mole percent, preferably 5-100 mole percent, of isoindolinone ether ketone units of the formula (I) and 0-99 mole percent, of arylene ether ketone units of the formula (II) wherein the variables are as defined herein.

20 Claims, 2 Drawing Sheets

(56) References Cited

U.S. PATENT DOCUMENTS

| | | | |
|---|---|---|---|
| 2011/0104417 A1* | 5/2011 | Wang | C08G 65/4037 428/36.9 |
| 2011/0151262 A1* | 6/2011 | Heuer | C07D 209/46 428/412 |
| 2014/0024787 A1* | 1/2014 | Gallucci | C08F 283/00 525/462 |
| 2015/0210806 A1 | 7/2015 | Peters | |

OTHER PUBLICATIONS

International Search Report; International Application No. PCT/US2017/027579; International Filing Date—Apr. 14, 2017; dated Jun. 30, 2017; 6 pages. (SS230005PCT).

Written Opinion; Application No. PCT/US2017/026903; International Filing Date—Apr. 11, 2017; dated Jun. 30, 2017; 6 pages. (SS230004PCT).

Written Opinion; Application No. PCT/US2017/027579; International Filing Date—Apr. 14; 2017; dated Jun. 30, 2017; 6 pages. (SS230005PCT).

International Preliminary Report on Patentability and Written Opinion of International Searching Authority; International Application No. PCT/US2017/026903; International Filing Date—Apr. 11, 2017; dated Oct. 25, 2018; 7 pages. (SS230005PCT).

* cited by examiner

POLYISOINDOLINONE COMPOSITIONS, METHODS OF MANUFACTURE, AND COMPOSITIONS AND ARTICLES FORMED THEREFROM

CROSS REFERENCE TO RELATED APPLICATIONS

This application is a National Stage application of PCT/US2017/02759, filed Apr. 14, 2017, which claims the benefit of U.S. Provisional Application No. 62/323,265, filed Apr. 15, 2016, both of which are incorporated by reference in their entirety herein.

BACKGROUND

This disclosure is directed to polyisoindolinone compositions such as poly(isoindolinone ether ether ketone) compositions, their methods of manufacture, and articles comprising the composition.

Polyaryl ether ketones (also known as PAEK) are a family of polymers containing aromatic ether units and ketone units. An example is poly(ether ether ketone) (PEEK), which is known for a high melting point (greater than 330° C.), excellent chemical resistance, thermal stability, hydrostability, low glass transition temperature, and high mechanical strength. Aromatic polyaryl ether ketones have significant commercial utility, especially as molded articles and as composites with glass, carbon, or polyaramide fibers for a variety of structural applications including in the aerospace and general engineering industries. The warpage and dimensional stability of these polymers, including PEEK, have been improved by the use of fillers such as glass fiber, carbon fiber, talc, and mica. Also, additives and such as polyetherimide blends with PEEK have been used to inhibit the crystallization of PEEK, and hence to help improve transparency.

There still remains a need in the art for new polyarylether ketone formulations. Despite their high melting point (Tm greater than 300° C.) PAEKs have a relatively low glass transition temperature (Tg), for example about 150° C. This low Tg limits their load bearing capability at temperatures above the Tg, especially in compositions with no reinforcing fiber. In addition, the high crystallinity of PAEK results in high shrinkage during transition from the melt to the solid phase, which can produce warp or other unfavorable changes in dimension. It would therefore be desirable to prepare polyarylether ketone formulations having one or more improved properties, such as reduced warpage, improved dimensional stability, or improved transparency. It would be especially desirable if one or more of these properties could be obtained with at least one of a high melting point, chemical resistance, thermal stability, hydrostability, high glass transition temperature, or high mechanical strength.

SUMMARY

A polymer composition comprises, based on the total weight of the polymers: 1-99 wt %, preferably 10-90 wt %, of a polymer component comprising a polyarylether ketone, a polybenzimdazole, a polyimide, a poly(aryl ether sulfone), a poly(phenylene sulfide), or a combination comprising at least one of the foregoing; and 1-99 wt %, preferably 10-90 wt %, of a polyisoindolinone, wherein the polyisoindolinone comprises: 1-100 mol %, preferably 5-100 mol %, of isoindolinone ether ketone units of the formula

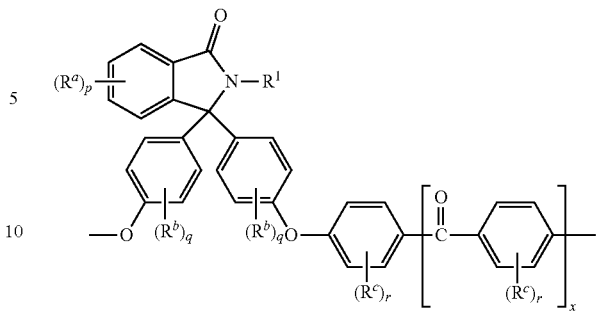

wherein each $R^1$ is independently the same or different, and is hydrogen, $C_{1-8}$ alkyl, $C_{3-8}$ cycloalkyl, or phenyl optionally substituted with 1-5 $C_{1-6}$ alkyl groups, each $R^a$ is independently the same or different, and is $C_{1-6}$ alkyl, each $R^b$ is independently the same or different, and is $C_{1-12}$ alkyl, $C_{2-12}$ alkenyl, $C_{3-8}$ cycloalkyl, or $C_{1-12}$ alkoxy, each $R^c$ is independently the same or different, and is $C_{1-12}$ alkyl, $C_{2-12}$ alkenyl, $C_{3-8}$ cycloalkyl, or $C_{1-12}$ alkoxy, each p, q, and r is independently the same or different, and is an integer of 0-4, preferably 0-2, and x is an integer of 1-4, preferably 1-3, preferably 1 or 2; and 0-99 mol %, preferably 0-95 mol %, of arylene ether ketone units of the formula

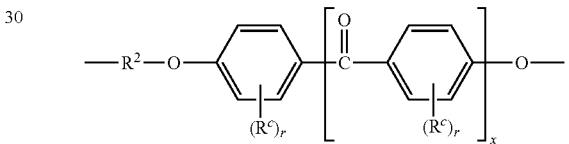

wherein each $R^2$ is independently the same or different, and is a $C_{6-30}$ substituted or unsubstituted arylene, each $R^c$ is independently the same or different, and is $C_{1-12}$ alkyl, $C_{2-12}$ alkenyl, $C_{3-8}$ cycloalkyl, or $C_{1-12}$ alkoxy, each r is independently the same or different, and is an integer of 0-4, preferably 0-2, and x is an integer of 1-4, preferably 1-3, preferably 1 or 2; and wherein when the polyisoindolinone is a poly(isoindolinone ether ether ketone), it has a least one, preferably at least two, preferably all of the following properties: a glass transition temperature greater than 145° C., or 145-270° C. as determined by differential scanning calorimetry, or substantially no blue phosphorescence in response to irradiation with ultraviolet light of 320-400 nm.

An article comprising the polymer composition is described. A method of forming the article comprises shaping, extruding, molding, or injection molding the polymer composition is also described.

The above described and other features are exemplified by the following drawings, detailed description, examples, and claims.

DETAILED DESCRIPTION

Figure 1:
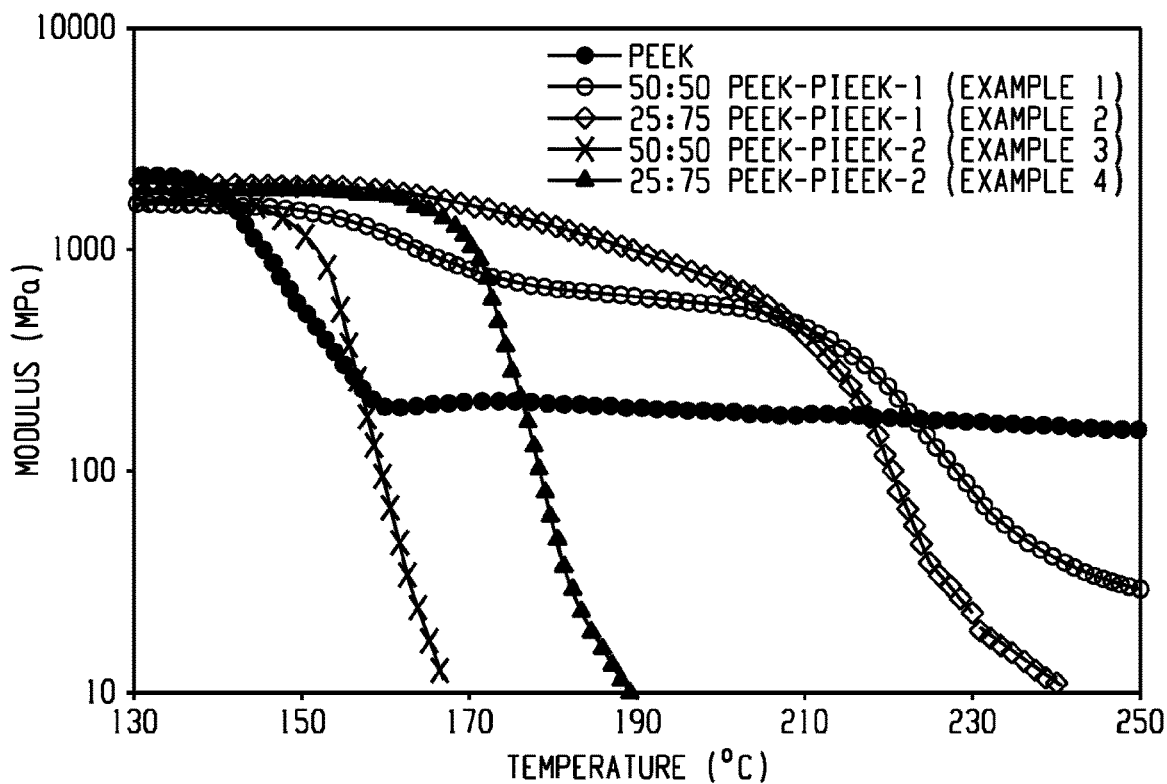
FIG. 1 is plot showing modulus vs. temperature for PIEEK/PEEK compositions.

Described herein are polymer compositions comprising polyaryl ether ketones comprising isoindolinone ether moieties and a second polymer component. The polymers that contain isoindolinone ether ketone moieties are poly(isoindolinone ether ether ketone)s, poly(isoindolinone ether ether ketone ketone)s, and the like, which will be referred to collectively herein as "polyisoindolinones" for convenience. The polyisoindolinones are melt processable, and have good high temperature properties, and can further have one or more of good transparency (clarity), good mechanical properties, low color, good hydrostability, and good chemical resistance. The second polymer component has a high Tg (for example greater than 200° C.). The combination of the polyisoindolinones and the high Tg second polymer component, such as other PAEKs, provides polymer compositions that can also have good high temperature properties, and can be melt processable and have one or more of good transparency (clarity), good mechanical properties, low color, good hydrostability, and good chemical resistance.

In an aspect, the polyisoindolinones comprise substantially or completely 100 mol % of isoindolinone ether ether ketone units of formula (1).

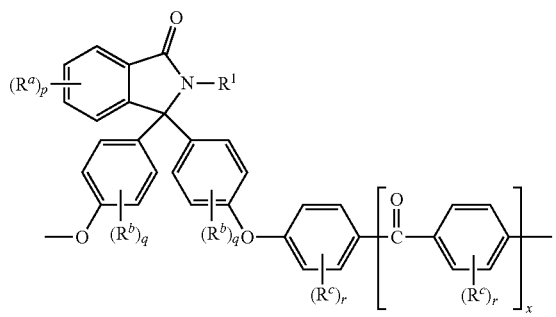

(1)

In formula (1), $R^1$ is hydrogen, $C_{1-8}$ alkyl, $C_{3-8}$ cycloalkyl, or phenyl optionally substituted with 1-5 $C_{1-6}$ alkyl groups. In an embodiment, $R^1$ is hydrogen, $C_{1-6}$ alkyl, $C_{3-6}$ cycloalkyl, or phenyl optionally substituted with 1-3 $C_{1-6}$ alkyl groups. Preferably, $R^1$ is hydrogen, $C_{1-3}$ alkyl, or unsubstituted phenyl. Most preferably, $R^1$ is unsubstituted phenyl. The isoindolinone ether ether ketone units in the same polymer can have different $R^1$ groups, but preferably each $R^1$ is the same.

Also in formula (1), each $R^a$ is independently the same or different, and is $C_{1-6}$ alkyl, preferably $C_{1-4}$ alkyl, more preferably $C_{1-3}$ alkyl; and p is an integer of 0-4, preferably 0, 1, or 2, most preferably 0. The isoindolinone ether ether ketone units in the same polymer can have different values of p, but preferably each value of p is the same.

Further in formula (1), each $R^b$ is independently the same or different, and is $C_{1-12}$ alkyl, $C_{2-12}$ alkenyl, $C_{3-8}$ cycloalkyl, or $C_{1-12}$ alkoxy, preferably $C_{1-6}$ alkyl, $C_{2-6}$ alkenyl, $C_{3-6}$ cycloalkyl, or $C_{1-6}$ alkoxy, more preferably $C_{1-3}$ alkyl, and most preferably methyl; and q is an integer of 0-4, preferably 0, 1, or 2, most preferably 0. The isoindolinone ether ether ketone units in the same polymer can have different values of q, but preferably each value of q is the same. When each $R^b$ is methyl and q is 1, the methyl group can be disposed ortho to the tetravalent carbon atom linking the phenoxy groups to the isoindolinones group.

Still further in formula (1), each $R^c$ is independently the same or different, and is $C_{1-12}$ alkyl, $C_{2-12}$ alkenyl, $C_{3-8}$ cycloalkyl, or $C_{1-12}$ alkoxy, preferably $C_{1-6}$ alkyl, $C_{2-6}$ alkenyl, $C_{3-8}$ cycloalkyl, or $C_{1-12}$ alkoxy, more preferably $C_{1-3}$ alkyl, most preferably methyl; and r is an integer of 0-4, preferably 0-2, most preferably 0. The isoindolinone ether ether ketone units in the same polymer can have different values of r, but preferably each value of r is the same.

Finally in formula (1), x is an integer of 1-4, preferably 1-3, preferably 1 or 2. The isoindolinone ether ether ketone units in the same polymer can have different values of x, but preferably each value of x is the same. The polyisoindolinones contain poly(isoindolinone ether ether ketone) units when x is 1. The polyisoindolinones contain poly(isoindolinone ether ether ketone ketone) units when x is 2, and so on.

In some embodiments of the polyisoindolinone of formula (1), $R^1$ is hydrogen, $C_{1-6}$ alkyl, $C_{3-6}$ cycloalkyl, or phenyl optionally substituted with 1-3 $C_{1-6}$ alkyl groups; $R^a$ is $C_{1-4}$ alkyl; each $R^b$ is independently the same or different, and is $C_{1-6}$ alkyl, $C_{2-6}$ alkenyl, $C_{3-6}$ cycloalkyl, or $C_{1-6}$ alkoxy; each R is independently the same or different, and is $C_{1-6}$ alkyl, $C_{2-6}$ alkenyl, $C_{3-8}$ cycloalkyl, or $C_{1-12}$ alkoxy; each p is the same, and is 0 or 1, preferably 0; each q is the same, and is 0 or 1, preferably 0; each r is the same, and is 0 or 1, preferably 0; and each x is an integer of 1-3, preferably 1 or 2.

In other embodiments of the polyisoindolinone of formula (1), $R^1$ is hydrogen, $C_{1-3}$ alkyl, or unsubstituted phenyl; each $R^a$ is $C_{1-3}$ alkyl; each $R^b$ is independently the same or different, and is $C_{1-3}$ alkyl, preferably methyl, each $R^c$ is independently the same or different, and is $C_{1-3}$ alkyl, preferably methyl, each p, q, and r is independently the same or different, and is an integer of 0, 1, or 2, preferably 0, and x is 1 or 2.

In a specific embodiment, $R^1$ is phenyl, p, q, and r are each zero, and x is 1, providing the poly(N-phenyl isoindolinone ether ether ketone) of formula (1a)

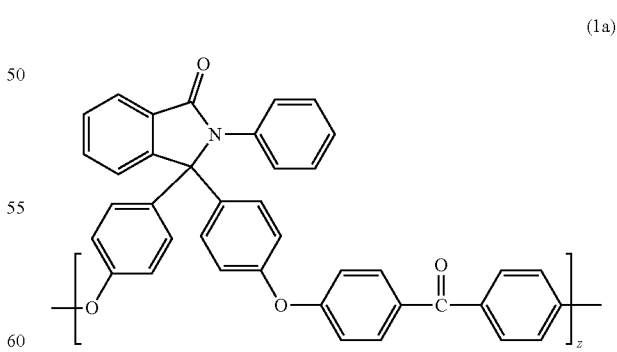

(1a)

wherein z is the number of repeating units, and is greater than 1, for example 2-1,000, or 5-800, or 10-500, or 10-350.

In another specific embodiment, $R^1$ is phenyl, p, q, and r are each zero, and x is 2, providing the poly(N-phenyl isoindolinone ether ether ketone ketone) of formula (1b).

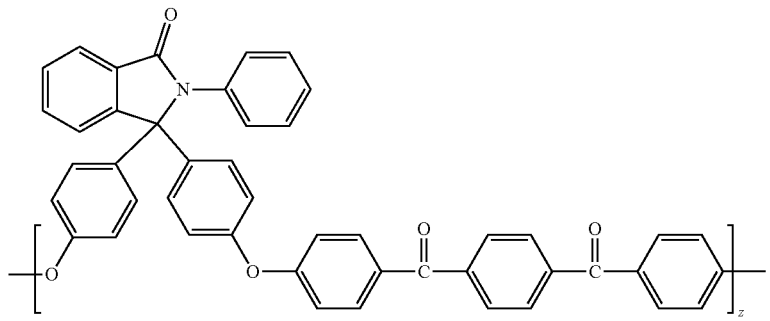

(1b)

wherein z is the number of repeating units, and is greater than 1, for example 2-1,000, or 5-800, or 10-500, or 10-350.

In another aspect, the polyisoindolinones can comprise additional ether units. In these embodiments, the polyisoindolinones comprise 1-99 mole percent (mol %), preferably 5-95 mol %, or 70-99 mol %, or 1-70 mol % of isoindolinone ether ether ketone units of formula (1), and 1-99 mol %, preferably 5-95 mol %, 1-30 mol %, or 30-99 mol %, of arylene ether ketone units of formula (2), based on the total moles of units of formulas (1) and (2).

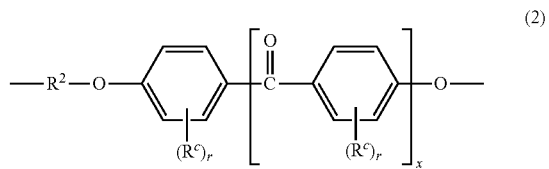

(2)

In formula (2), each $R^c$ is independently the same or different, and is $C_{1-12}$ alkyl, $C_{2-12}$ alkenyl, $C_{3-8}$ cycloalkyl, or $C_{1-12}$ alkoxy; preferably each $R^c$ is the same and is $C_{1-3}$ alkyl, preferably methyl; and each r is independently the same or different, and is an integer of 0-4, preferably 0-2, more preferably 0 or 1, still more preferably 0. The arylene ether ketone units in the same polymer can have different values of r, but preferably each value of r is the same.

Further in formula (2), x is an integer of 1-4, preferably 1-3, more preferably 1 or 2. The arylene ether ketone units in the same polymer can have different values of x, but preferably each value of x is the same. The polyaryl ether ketones contain poly(aryl ether ether ketone) units when each x is 1. The polyaryl ether ketones contain poly(aryl ether ether ketone ketone) units when x is 2.

Also in formula (2) each $R^2$ is independently the same or different, and is a $C_{6-30}$ substituted or unsubstituted arylene. In an embodiment, $R^2$ is a $C_{6-30}$ substituted or unsubstituted arylene of formula (3).

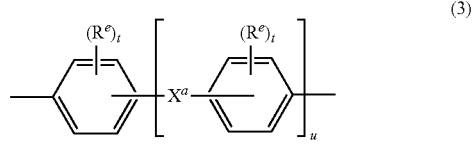

(3)

In formula (3), each $R^e$ is independently the same or different, and is $C_{1-12}$ alkyl, $C_{2-6}$ alkenyl, $C_{3-6}$ cycloalkyl, or $C_{1-6}$ alkoxy, preferably $C_{1-6}$ alkyl, $C_{2-6}$ alkenyl, $C_{3-6}$ cycloalkyl, or $C_{1-6}$ alkoxy, more preferably each $R^e$ is the same and is $C_{1-3}$ alkyl, most preferably methyl; and each t is independently the same or different, and is an integer of 0-4, preferably an integer of 0-2, and more preferably each t is the same, and is 0 or 1, most preferably 0. Each $R^2$ in the same polymer can have different values of t, but preferably each value of t is the same.

Further in formula (3), each u is independently the same or different, and is an integer of 0-4, preferably 0-2, and more preferably each u is the same and is 0 or 1. Each $R^2$ in the same polymer can have different values of t, but preferably each value of t is the same.

Finally in formula (3), $X^a$ is a single bond, —O—, —S—, —S(=O)—, —S(=O)$_2$—, —C(=O)—, —P(R)(=O)— (wherein R is a $C_{1-8}$ alkyl or $C_{6-12}$ aryl), or a $C_{1-18}$ organic bridging group. Preferably $X^a$ is a single bond, —O—, —S—, —S(=O)—, —S(=O)$_2$—, —C(=O)—, —P(R) (=O)— (wherein R is a $C_{1-6}$ alkyl or phenyl), a $C_{1-12}$ alkylidene, a substituted or unsubstituted $C_{3-6}$ cycloalkylene, or a substituted or unsubstituted $C_{3-6}$ cycloalkylidene. More preferably, $X^a$ is a single bond, —O—, —S—, —S(=O)—, —S(=O)$_2$—, —C(=O)—, —P(R)(=O)— (wherein R is a $C_{1-6}$ alkyl or phenyl) or a $C_{1-6}$ alkylidene. Each $R^2$ in the same polymer can have the same $X^a$, or two different $X^a$ groups, or three different $X^a$ groups. In an embodiment, each $R^2$ in the same polymer has the same $X^a$ group.

Specific examples of the foregoing $R^2$ groups include those derived from p-hydroquinone, methyl hydroquinone, dimethyl hydroquinone, tert-butyl hydroquinone, di-tert-butyl hydroquinone, resorcinol, 4,4'-biphenol, 4,4'-dihydroxydiphenyl ether, 4,4'-isopropylidenediphenol (also known as bisphenol A, or BPA), bis(3,5-dimethyl-4-hydroxyphenyl)isopropylidene, 4,4'-(hexafluoroisopropylidene)diphenol, 4,4'-(hexafluoroisopropylidene)diphenol, bis(4-hydroxyphenyl) sulfoxide, bis(4-hydroxyphenyl) sulfone, bis(4-hydroxyphenyl) sulfide, bis(3,5-dimethyl-4-hydroxyphenyl) sulfone, 4,4'-(1-phenylethylidene)bisphenol, 4,4'-dihydroxybenzophenone, 1,4-bis-(p-hydroxybenzoyl)benzene, 1,3-bis-(p-hydroxybenzoyl)benzene. A combination comprising at least one of the foregoing can be present in the polymer.

In a preferred embodiment of formula (2), each $R^c$ is independently the same or different, and is $C_{1-6}$ alkyl, $C_{2-6}$ alkenyl, $C_{3-6}$ cycloalkyl, or $C_{1-6}$ alkoxy; each r and t is independently the same or different, and is an integer of 0 or 1, preferably 0; each u is independently the same or different, and is an integer of 0 or 1; x is 1-3, more preferably 1 or 2; and $X^a$ is a single bond, —O—, —S—, —S(=O)—, —S(=O)$_2$—, —C(=O)—, —P(R)(=O)— wherein R is a $C_{1-8}$ alkyl or $C_{6-12}$ aryl, a $C_{1-12}$ alkylidene, a substituted or unsubstituted $C_{3-6}$ cycloalkylene, or a substituted or unsubstituted $C_{3-6}$ cycloalkylidene.

In another preferred embodiment of formula (2), each $R^c$ is the same $C_{1-3}$ alkyl, preferably methyl, each r and t is independently the same or different, and is an integer of 0 or 1, preferably 0; each u is independently the same or different, and is an integer of 0 or 1; x is 1 or 2, and $X^a$ is a single bond, —O—, —S—, —S(=O)—, —S(=O)$_2$—, —C(=O)—, —P(R)(=O)— (wherein R is a $C_{1-6}$ alkyl or phenyl), or a $C_{1-6}$ alkylidene.

For example, the arylene ether ketone units of formula (2) can be of formula (2a.)

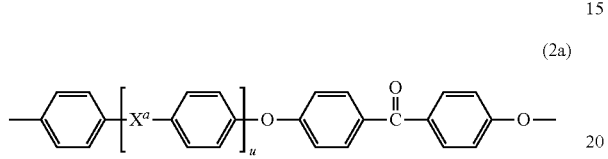

(2a)

wherein $X^a$ is a single bond, —O—, —S—, —S(=O)—, —S(=O)$_2$—, —C(=O)—, —P(R)(=O)— (wherein R is a $C_{1-6}$ alkyl or phenyl), a $C_{1-12}$ alkylidene, a substituted or unsubstituted $C_{3-6}$ cycloalkylene, or a substituted or unsubstituted $C_{3-6}$ cycloalkylidene, and u is 0 or 1. Preferably $X^a$ is a single bond, —O—, —S—, —S(=O)—, —S(=O)$_2$—, —C(=O)—, —P(R)(=O)— (wherein R is a $C_{1-6}$ alkyl or phenyl), or a $C_{1-6}$ alkylidene, and u is 0 or 1.

The mole ratios of the isoindolinone ether ether ketone units (1) to the arylene ether ketone units (2) can vary widely, depending on the desired characteristics of the polymer, ease of synthesis, cost, and like considerations. As stated above, the mole ratio of isoindolinone ether ether ketone units (1):arylene ether ketone units (2) can be from 1:99 to 99:1, or from 5:95 to 95:5. In some embodiments the mole ratio of units (1):units (2) can be 10:90 to 90:10, or 20:80 to 80:20, or 30:70 to 70:30, or 40:60 to 60:40. In other embodiments the mole ratio of units (1):units (2) can be from 50:50 to 99:1, or from 60:40 to 95:5, or 70:30 to 90:10. Alternatively, the mole ratio of units (1):units (2) can be from 1:99 to 50:50, or 5:95 to 40:60, or 10:90 to 30:70.

Within these mole ranges, in a preferred embodiment of the polyisoindolinones comprising isoindolinone ether ether ketone units (1) and arylene ether ketone units (2), $R^1$ is hydrogen, $C_{1-6}$ alkyl, $C_{3-6}$ cycloalkyl, or phenyl optionally substituted with 1-3 $C_{1-6}$ alkyl groups; $R^a$ is $C_{1-4}$ alkyl; each $R^b$ is independently the same or different, and is $C_{1-6}$ alkyl, $C_{2-6}$ alkenyl, $C_{3-6}$ cycloalkyl, or $C_{1-6}$ alkoxy; each $R^c$ is independently the same or different, and is $C_{1-6}$ alkyl, $C_{2-6}$ alkenyl, $C_{3-8}$ cycloalkyl, or $C_{1-12}$ alkoxy; each $R^e$ is independently the same or different, and is $C_{1-6}$ alkyl, $C_{2-6}$ alkenyl, $C_{3-6}$ cycloalkyl, or $C_{1-6}$ alkoxy; each p, q, r, s, and t is independently the same or different, and is an integer of 0 or 1, preferably 0; each u is independently the same or different, and is 0 or 1; each x is independently the same or different, and is an integer of 1-4, preferably 1-3, more preferably 1 or 2.

In another preferred embodiment of the polyisoindolinones comprising isoindolinone ether ether ketone units (1) and arylene ether ketone units (2), $R^1$ is hydrogen, $C_{1-3}$ alkyl, or unsubstituted phenyl; each $R^a$ is the same $C_{1-3}$ alkyl; each $R^b$ is the same $C_{1-3}$ alkyl, preferably methyl; each $R^c$ is the same $C_{1-3}$ alkyl, preferably methyl; each $R^e$ is the same $C_{1-3}$ alkyl, preferably methyl; each p, q, r, s, and t is independently the same or different, and is an integer of 0 or 1, preferably 0; each u is independently the same or different, and is 0 or 1; each x is the same, and is 1 or 2.

In another aspect, a method for the synthesis of the foregoing polyisoindolinones is described. In general, the synthesis proceeds via nucleophilic substitution. This and other processes for the manufacture of the polyisoindolinones are described, for example, in U.S. Pat. No. 4,176,222. In particular, a polyisoindolinone comprising isoindolinone ether ether ketone units of formula (1) can be obtained in a polymerization reaction of a dihydroxy isoindolinone compound of formula (4) with a dihalogenated aromatic compound of formula (5)

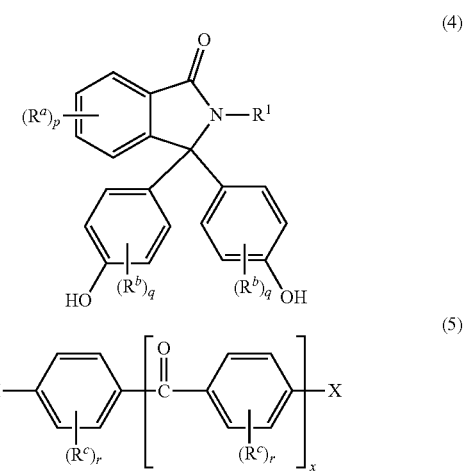

(4)

(5)

in a liquid-phase polymerization mixture that further comprises a base. The variables in the dihydroxy isoindolinone compound (4) and the dihalogenated aromatic compound (5) are as defined in formulas (1) and (2); and each X formula (5) is independently the same or different, and is a halogen, preferably fluorine or chlorine.

In another embodiment, a polyisoindolinone comprising isoindolinone ether ether ketone units (1) and arylene ether ketone units (2) can be made by further including a dihydroxy arylene compound of formula (6) in the polymerization mixture.

HO—$R^2$—OH (6)

The variable $R^2$ in formula (6) is as defined in formula (2) and (2a). The relative amount of dihydroxy isoindolinone compound (4) to dihydroxy arylene compound (6) depends on the relative reactivity of the dihydroxy compounds, the order of addition, the desired mole ration in the polymer, and like considerations. In some embodiments, the amount of dihydroxy isoindolinone compound (4) is 1-100 mol %, preferably 5-100 mol %, and the amount of dihydroxy arylene compound (6) is 0-99 mol %, preferably 5-95 mol %, each based on the total moles dihydroxy isoindolinone compound (4) and dihydroxy arylene compound (6) (referred to collectively herein as "the dihydric monomer composition"). In some embodiments, the relative molar ratio of dihydroxy isoindolinone compound (4) to dihydroxy arylene compound (6) can be 10:90 to 90:10, or 20:80 to 80:20, or 30:70 to 70:30, or 40:60 to 60:40; or, to control crystallinity, 70:30 to 100:0 (to obtain a crystalline polymer) or 1:99 to 70:30 (to obtain a noncrystalline polymer). In other embodiments the mole ratio of hydroxy isoindolinone compound (4) and dihydroxy arylene compound (6) can be from 50:50 to 99:1, or from 60:40 to 95:5, or 70:30 to 90:10.

Alternatively, the mole ratio of hydroxy isoindolinone compound (4) and dihydroxy arylene compound (6) can be from 1:99 to 50:50, or 5:95 to 40:60, or 10:90 to 30:70.

Similarly, conditions for the formation of the poly(isoindolinone) can be varied depending on considerations such as the reactivity of the reactants, desired yields and purity, efficiency, and cost.

For example, the hydroxy isoindolinone compound (4) can have less than 1000 ppm, or less than 800 ppm, or less than 500 ppm each of a monoaminophenol of formula (7a) or a phenolphthalein compound of formula (7b).

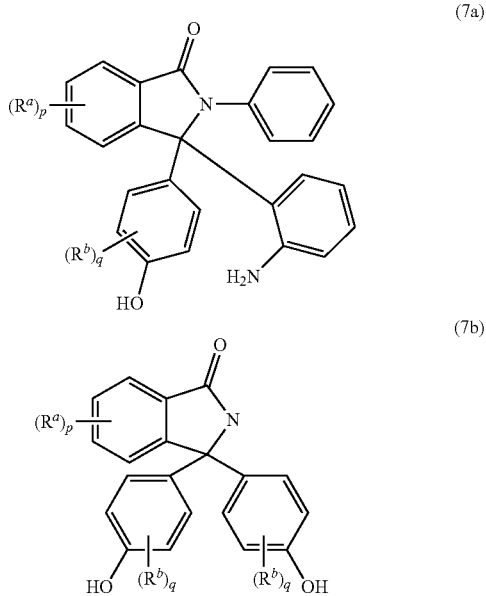

(7a)

(7b)

In formulas (7a) and (7b), each variable is the same as in formula (1) or (1a). The amount of the monoaminophenol (7a) or phenolphthalein compound (7b) can each be determined by liquid chromatography analysis as is known in the art.

The base is selected to increase the rate of polymerization, and can be selected based on the specific reactants, solvent, and polymerization conditions. The base can be an alkali or alkaline earth metal hydroxide, alkali or alkaline earth metal carbonate, alkali or alkaline earth metal bicarbonate, or a combination comprising at least one of the foregoing. In an embodiment, the base is sodium hydroxide, potassium hydroxide, sodium carbonate, cesium hydroxide, potassium carbonate, cesium carbonate, strontium carbonate, sodium hydrogen carbonate, potassium hydrogen carbonate, or a combination comprising at least one of the foregoing.

To conduct the polymerization in a liquid phase, an organic solvent can be present that is effective to dissolve the reactants. Examples of organic solvents that can be used include diphenylsulfone, dimethyl sulfone, sulfolane, N-methyl-caprolactam, N-methyl-2-pyrrolidone, dimethyl sulfoxide, dimethyl acetamide, dimethyl formamide, diphenylether, tetramethylurea, N-ethylpyrrolidone, 1,3-dimethyl-2-imidazolidinone, or a combination comprising at least one of the foregoing.

A cosolvent can be present during the polymerizing, for example for the purpose of azeotropic distillation of water from the polymerization mixture. The cosolvent can be an aromatic hydrocarbon, preferably toluene, xylene, ortho-dichlorobenzene, trichlorobenzene, or mesitylene, or an aliphatic hydrocarbon, preferably cyclohexane.

The reactant content (also referred to as "solids content") in the liquid-phase polymerization mixture can vary depending on the reactants, polymerization conditions, and equipment used to conduct the polymerization. For example, the solids content can be 25-80% by weight, based on the total weight of the polymerization mixture.

The polymerization is conducted under conditions effective to promote the nucleophilic substitution. For example the polymerization can be conducted for 1-24 hours, or 2 to 12 hours, or 2 to 6 hours. The polymerization can be conducted at atmospheric pressure, or greater than atmospheric pressure, for example up to 10 bar The polymerization can be conducted under an inert atmosphere, for example under nitrogen or argon. The polymerization can be conducted at room temperature, but is preferably heated, for example to a temperature of 50-400° C., or 80-400° C. In some embodiments a multi-step heating regime is used, for example heat at to a temperature greater than 100° C., and less than the decomposition temperature of the reactants, the solvent, and the polymer for a first time period, followed by heating at 200-350° C. for a second time period until the polymerization has proceed to the desired degree of completion.

The relative molar ratio of the dihydric monomer composition (isoindolinone ether ether ketone units (1) and arylene ether ketone units (2) (if present)) to the dihalogenated aromatic compound (5) can be varied depending on the reactivity of the reactants, order of addition, and like polymerization considerations. In some embodiments the molar ratio of the dihydric monomer composition to the dihalogenated aromatic compound (5) is 1.8:2.2 to 2.2:1.8, or 1.9:2:1, or 1.95:2.05 to 2.05:1.95.

In some embodiments, the dihydroxy isoindolinone compound (4), the dihydroxy arylene compound (6), or both, are converted to the corresponding alkali or alkaline earth metal salts before or during contacting with the dihalogenated aromatic compound (5). Preferably, before contacting with the dihalogenated aromatic compound (5), the monomers of the dihydric monomer composition are at least partially, preferably substantially completely or completely, converted to the corresponding alkali or alkaline earth metal salts (8) or (9)

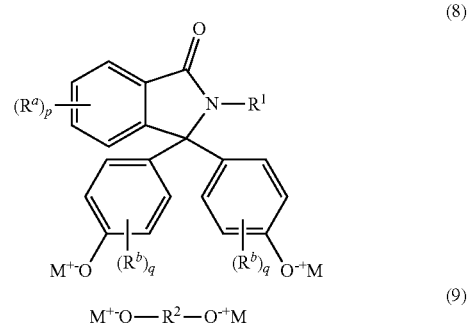

(8)

(9)

to provide a dialkali or alkaline earth metal salt composition. The variable in formulas (8) and (9) are as defined in formulas (1), (1a), (2), and (2a). Conversion to the salt can be effected by pre-contacting the dihydroxy isoindolinone compound (4), the dihydroxy arylene compound (6), or both with the base used in the polymerization.

In a preferred embodiment, the dialkali or alkaline earth metal salt composition is formed in situ by reacting the dihydroxy isoindolinone compound (4), the dihydroxy arylene compound (6), or both in the presence of an alkali or alkaline earth metal source, under conditions effective to form the dialkali or alkaline earth metal salts, preferably wherein the alkali or alkaline earth metal source is provided in an amount of 0.5-1.05 molar equivalent per mole of hydroxy group. The alkali or alkaline earth metal source can be an alkali or alkaline earth metal hydroxide, alkali or alkaline earth metal carbonate, alkali or alkaline earth metal bicarbonate, or a combination comprising at least one of the foregoing. In an embodiment, the alkali or alkaline earth metal source is sodium hydroxide, potassium hydroxide, sodium carbonate, cesium hydroxide, potassium carbonate, cesium carbonate, strontium carbonate, sodium hydrogen carbonate, potassium hydrogen carbonate, or a combination comprising at least one of the foregoing.

The method can further comprise dehydrating the alkali or alkaline earth metal salt composition to remove water before, during, or after introduction of the dihalogenated aromatic compound (5). Dehydrating can be by one or more of azeotropic distillation in the presence of suitable co-solvent or in the presence of inert gas atmosphere sweep, preferably nitrogen, argon, or a combination comprising at least one of the foregoing. In an embodiment, dehydration is conducted before heating the polymerization mixture to a temperature greater than 100° C., and less than the decomposition temperature of the reactants, the solvent, and the polymer; and then preferably heating the polymerization mixture from 200-350° C. until the polymerization has proceed to the desired degree of completion.

In some embodiments, a water content of the liquid-phase polymerization mixture is maintained at less than 0.5 wt %, or less than 0.25 wt %, based on the total weight of the polymerization mixture. The water content can be maintained as this level by azeotropic distillation in the presence of suitable co-solvent or in the presence of inert gas atmosphere sweep, preferably nitrogen, argon, or a combination comprising at least one of the foregoing.

The polymerizing can be in the presence of an end capping agent, preferably 1.5-4 mol % of an end capping agent, based on the total moles of dihydric monomer. The end capping agent can be a monohydric compound, a monohalide compound, a monoacyl halide, or a combination comprising at least one of the foregoing. Preferably the monohydric compound or monohalide compound is aromatic. For example, the monohydric compound can be phenol, p-tertbutyl phenol, p-cumylphenol, 4-phenylphenol, or 4-hydroxybenzophenone; the monohalide compound can be a $C_{1-12}$ alkyl halide or $C_{6-12}$ aryl halide; and the monoacyl halide can be a $C_{2-12}$ alkyl acyl halide or $C_{6-12}$ aryl acyl halide. The end capping agent can be added at the beginning, during, or at the end of the polymerization, but more preferably the end capping agent is added at the beginning or during the polymerization.

The progress of the polymerization can be monitored by a number of methods, for example by monitoring a polymer hydroxyl end group content, or polymer halogen content, or polymer molecular weight change.

The hydroxyl end group content of the polymer can be determined by various titration and spectroscopic methods well known in the art. Spectroscopic methods include infrared, nuclear magnetic resonance (NMR), Raman spectroscopy, and fluorescence. Examples of infrared methods are described in J, A. Kreuz, et al, J. Poly. Sci. Part A-1, vol. 4, pp. 2067 2616 (1966). Examples of titration methods are described in Y. J. Kim, et al, Macromolecules, vol. 26, pp. 1344 1358 (1993). It may be advantageous to make derivatives of polymer end groups to enhance measurement sensitivity using variations of methods as described in K. P. Chan et al., Macromolecules, vol. 27, p. 6731 (1994) and J. S. Chao, Polymer Bull., vol. 17, p. 397 (1987). In some embodiments, the polymerization is continued until the resultant polyisoindolinone has a hydroxyl end group content of less than 700 parts per million by weight (ppm) of the polymer, or less than 500 ppm.

The halogen end group content of the polymer can be determined by NMR spectroscopy or ion chromatography after combustion, for example. In some embodiments, the polymerization is continued until the resultant polyisoindolinone has a halogen end group content of less than 900 ppm, or less than 700 ppm. In some embodiments, the polymerization is continued until the resultant polyisoindolinone has a weight average molecular weight (Mw) change of less than 500 Daltons/hour, or less than 300 Daltons/hour.

In some embodiments, the polymerization is continued until the resultant polyisoindolinone has a weight average molecular weight (Mw) change of less than 500 Daltons/hour, or less than 300 Daltons/hour. The Mw can be determined, for example, by The Mw can be determined, for example, by light scattering, inherent viscosity (IV) techniques, or gel permeation chromatography (GPC) using polystyrene standards and aggressive solvents such as those used for polyphenylene sulfide (e.g., o-chloro naphthalene) or PEEK (e.g, 80% chloroform with 20% dichloroacetic acid).

The polyisoindolinones can be separated from the polymerization mixture by methods known in the art, for example by decanting, centrifuging, or extracting. The as-synthesized polyisoindolinones can be further purified by methods known in the art, for example by extracting, precipitating, washing, or crystallizing.

The above methods for the manufacture of the poly (isoindolinone ether ether ketone)s in particular provide polymers having at least one, preferably at least two, preferably all of the following properties: a glass transition temperature greater than 145° C., or 145-270° C. as determined by differential scanning calorimetry; less than 20 weight percent (wt %) solubility at 23° C. in dichloromethane, ortho-dichlorobenzene, or chloroform, or substantially no blue phosphorescence in response to irradiation with ultraviolet light of 320-400 nm. Without being bound by theory, it is believed that the above methods provide poly (isoindolinone ether ether ketone)s of higher molecular weight, or greater purity. These polymers are accordingly more suitable for use in articles requiring one or more of improved chemical resistance, improved heat resistance, improved mechanical properties, improved transparency, or higher Tg.

In general, the properties of the polyisoindolinones can be varied to suit the particular application, by varying the type of units, including any substituents on the units, the relative amount of each type of unit, and the method of manufacture of the polyisoindolinones.

In some embodiments, the polyisoindolinones, in particular the poly(isoindolinone ether ether ketone)s, can have a glass transition temperature greater than 145° C., or 145-300° C., or 145-270° C. as determined by differential scanning calorimetry, using a heating and cooling ramp of 20° C./minute.

The polyisoindolinones can have less than 25 wt %, or less than 15 wt %, or less than 5 wt %, or less than 1 wt % solubility at 23° C. in dichloromethane, orthodichlorobenzene, or chloroform. The polyisoindolinones can have less than 25 wt %, or less than 15 wt %, or less than 5 wt %, or less than 1 wt % solubility at 23° C. in 1,1,1,3,3,3-hexafluoro-2-propanol, N-methyl-2-pyrrolidone, dimethyl sulfoxide, dimethyl acetamide, dimethyl formamide, m-cresol, o-dichlorobenzene, 1,3,5-trichlorobenzene, a mixture comprising phenol and trichloroethane, or a combination comprising at least one of the foregoing.

The polyisoindolinones, in particular the poly(isoindolinone ether ether ketone)s, can have no, or substantially no, blue phosphorescence in response to irradiation with ultraviolet light of 320-400 nm.

The polyisoindolinones, in particular the poly(isoindolinone ether ether ketone)s, can have less than 25 ppm, or less than 20 ppm, or less than 10 ppm, of benzylic protons based on the weight of the polyisoindolinone, which can be determined using ordinary chemical analysis for example proton NMR spectroscopy. In an embodiment, the polymer is free or substantially free of linkages that can react in the melt to change the molecular weight of the polymer. The presence of benzylic protons in the polyisoindolinone can accelerate reactions that change molecular weight in the melt. Due to the increased melt stability of the resultant polymer, polyisoindolinones with structural units derived from monomers and capping agents essentially free of benzylic protons are desirable in some applications, especially those involving isolation from the melt and melt processing after polymerization. As used herein, "substantially or essentially free of benzylic protons" means that the polyisoindolinone has less than or equal to about 5 mole % of structural units, or less than or equal to about 3 mole % structural units, or less than or equal to about 1 mole % structural units derived containing benzylic protons. "Free of benzylic protons" means that the polyisoindolinone has zero mole % of structural units derived from monomers and end cappers containing benzylic protons.

The polyisoindolinones, in particular the poly(isoindolinone ether ether ketone)s, can have a hydroxyl polymer end group content of less than 700 ppm, or less than 500 ppm, or less than 300 ppm based on the weight of the polyisoindolinone, which can be determined by various titration and spectroscopic methods well known in the art as described above. Low hydroxyl group content can provide compositions having improved thermal properties, for example long term heat aging at elevated temperatures (e.g., above 100° C.).

The polyisoindolinones, in particular the poly(isoindolinone ether ether ketone)s, can have a halogen content of less than 900 ppm, or less than 700 ppm, based on the weight of the polyisoindolinone, which can be determined by ordinary chemical analysis; for example combustion followed by ion chromatogram or ICP atomic emission spectroscopy. Polymers free of halogen atoms are sometimes desired for regulatory and environmental reasons. In an embodiment the polyisoindolinone is essentially free of halogen atoms. "Essentially free of halogen atoms" as used herein means that the polyisoindolinone has less than or equal to about 5 mole % of structural units, or, more specifically, less than or equal to about 3 mole % of structural units, or, even more specifically, less than or equal to about 1 mole % of structural units derived from compounds containing halogen atoms.

The polyisoindolinones, in particular the poly(isoindolinone ether ether ketone)s, can have a residual alkali or alkaline earth metal cation content of less than 500 ppm, or less than 300 ppm, based on the weight of the polyisoindolinone, which can be determined by ion chromatography or inductively coupled plasma mass spectroscopy (ICP-MS). Low alkali or alkaline earth metal content can provide improved electrical properties, for example a low comparative tracking index (CTI). Low CTI is especially desirable for electrically insulating compositions.

The polyisoindolinones, in particular the poly(isoindolinone ether ether ketone)s, can have a residual solvent content of less than 500 ppm, or less than 250 ppm, or less than 100 ppm based on the weight of the polyisoindolinone, which can be determined by gas or liquid chromatography. Polymers having low solvent content are sometimes desired for regulatory and environmental reasons and to achieve molded parts with reduced surface defects such as mold-splay or plate-out.

The polyisoindolinones, in particular the poly(isoindolinone ether ether ketone)s, can have a weight average molecular weight of at least 15,000 Daltons, preferably 20,000-100,000 Daltons, more preferably 20,000-60,000 Daltons, as determined by GPC or IV techniques as described above.

The polyisoindolinones, in particular the poly(isoindolinone ether ether ketone)s, can have an onset decomposition temperature of greater than 485° C. as determined using thermogravimetric analysis in air and nitrogen.

The polyisoindolinones, in particular the poly(isoindolinone ether ether ketone)s, can have a coefficient of thermal expansion of 30-90 ppm/° C., or 30-60 ppm/° C., or 40-60 ppm/° C., as determined according to ASTM E 831.

The polyisoindolinones, in particular the poly(isoindolinone ether ether ketone)s, can have a water uptake of less than 3 percent, preferably less than 1 percent, most preferably less than 0.6 percent at 23° C., after 24 hours of direct immersion.

The polyisoindolinones, in particular the poly(isoindolinone ether ether ketone)s, can have a shift in melt viscosity of less than 30% over 30 min at 380 C under a nitrogen atmosphere as measured in a small amplitude oscillatory time sweep rheology at a fixed angular frequency of 10 radians/second.

The polyisoindolinones, in particular the poly(isoindolinone ether ether ketone)s, can have a char yield of greater than 30 wt %, as determined using thermogravimetric analysis under inert atmosphere of nitrogen.

The polyisoindolinones, in particular the poly(isoindolinone ether ether ketone)s, can have sufficient toughness wherein a melt-pressed film of 50-500 micrometer (μm) thickness, or 300 μm thickness, can be folded 180 degrees more than 3 times without breaking.

The polyisoindolinones, in particular the poly(isoindolinone ether ether ketone)s, can have sufficient hydrostability wherein a melt-pressed film of 50-500 μm thickness, or 300 μm thickness, can be folded 180 degrees greater than 3 times without breaking after autoclaving for 3 days at 130° C. The polyisoindolinones, in particular the poly(isoindolinone ether ether ketone)s, can have sufficient hydrostability wherein a melt-pressed film of 50-500 μm thickness, or 300 μm thickness, can be folded 180 degrees greater than 3 times without breaking after autoclaving for 3 days at 130° C.

The polyisoindolinones, in particular the poly(isoindolinone ether ether ketone)s, can have a modulus of greater than 1000 MPa at 150-300° C., as measured by ASTM D5418, on a film having a thickness of 150-500 μm, or 300 μm.

A 150-500 μm- or 300 μm-thick molded sample of the polymer compositions has at least 65% transmission at 850 nm, 1310 nm, or 1550 nm; or a 150-500 μm-thick molded sample of the polymer compositions has greater than 70% transmission as measured using the color space CIE1931 (Illuminant C and a 2° observer).

The polymer compositions further comprise a second polymer that is not the same as the polyisoindolinones. In a preferred embodiment, the second polymer also has good heat resistance. Such polymers can be a polyarylether ketone, a polybenzimidazole, a polyimide, a poly(aryl ether sulfone), a poly(phenylene sulfide), or a combination comprising at least one of the foregoing.

In certain aspects, the polymer to be combined with the polyisoindolinone is a polyarylether ketone (PAEK). As used herein, "polyarylether ketone" includes several polymer types containing aromatic rings, such as phenyl rings, linked primarily by ketone and ether groups in different sequences. Examples of PAEKs are polyether ketones (PEK), polyether ether ketones (PEEK), polyether ketone ether ketone ketones (PEKEKK) and polyether ketone ketones (PEKK) and copolymers containing such groups. The PAEKs can include monomer units containing an aromatic ring, such as a phenyl ring, a keto group, and an ether group in any sequence. Low levels, for example less than 10 mole %, of addition linking groups can be present as long as they do not substantially alter the properties of the PAEKs. The term polyarylether ketone as used herein further includes homopolymers, copolymers, terpolymers, graft copolymers, and the like.

Polyarylether ketones can include arylene ether ketone units of formula (2). In preferred embodiments, polyarylether ketones that are highly crystalline, with melting points above 300° C., can be used in the polyisoindolinone compositions. Examples of these crystalline polyarylether ketones contain units shown in the structures (10)-(14).

Other examples of crystalline polyarylether ketones can be generically characterized as containing repeating units of formula (15)

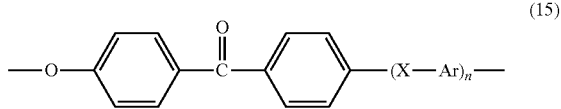

wherein each Ar is independently a divalent aromatic group that can be phenylene, biphenylene, or naphthalene; each X is independently —O—, —C(O)—, —O—Ar—C(O)—, —S—, —SO$_2$—, —S(=O)—, —P(R)(=O)— wherein R is a C$_{1-8}$ alkyl or C$_{6-12}$ aryl, or a direct bond; and n is an integer of from 0 to 10.

Compositions of two or more PAEK polymers can also be used. The polyarylether ketones can have an Mw of 5,000 to 150,000 g/mole, or 10,000-80,000 g/mole. Polyarylether ketone)s can be prepared by methods well known in the art. Such processes are described for example, in U.S. Pat. Nos. 4,176,222; 4,396,755; 4,398,020; and 4,175,175. Exemplary PEEKs include those commercially available from Victrex Ltd. as VICTREX® PEEK. Exemplary PEKEKKs include those that are commercially available from BASF Co. as ULTRAPEK®.

In another aspect, the second polymer component in the polymer composition can be an aromatic benzimidazole (PBI). Processes for the preparation of aromatic polybenzimidazoles are described in a number of U.S. Pat. Nos. 3,901,855; 4,002,679; 3,433,772; 3,441,640; and 4,020,142. Aromatic PBI is commercially available from PBI Performance Products Inc as CELAZOLE® PBI polymer and has units of the formula (16).

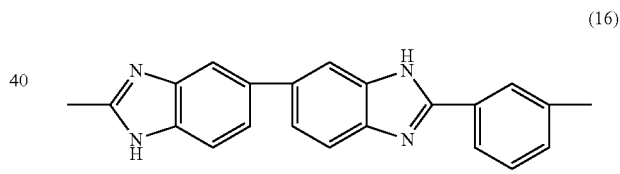

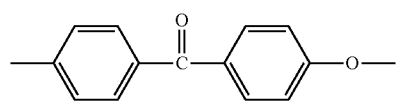

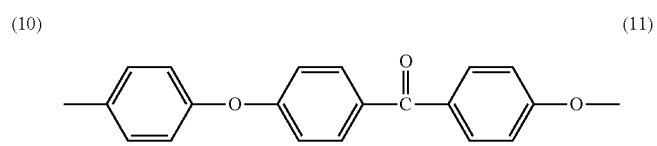

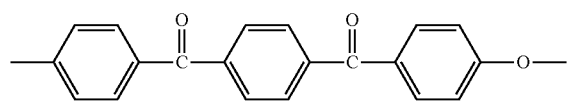

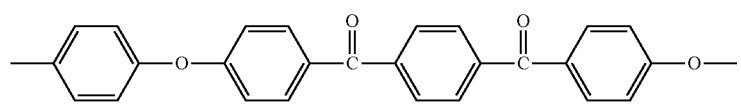

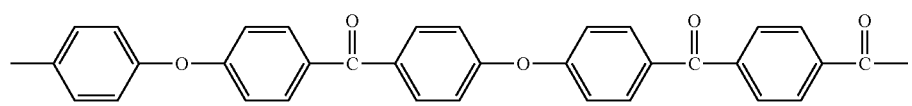

In another aspect, the second polymer component in the polymer composition can be a polyimide such as a polyetherimide (PEI) and copolymers thereof. Polyimides comprise more than 1, for example 1-1000, or 1-500, or 10 to 100, structural units of formula (17)

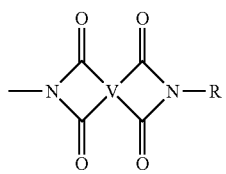
(17)

wherein each V is the same or different, and is a substituted or unsubstituted tetravalent $C_{4-40}$ hydrocarbon group, for example a substituted or unsubstituted $C_{6-20}$ aromatic hydrocarbon group, a substituted or unsubstituted, straight or branched chain, saturated or unsaturated $C_{2-20}$ aliphatic group, or a substituted or unsubstituted $C_{4-8}$ cycloalkylene group or a halogenated derivative thereof, in particular a substituted or unsubstituted $C_{6-20}$ aromatic hydrocarbon group. Exemplary aromatic hydrocarbon groups include any of those of the formulas

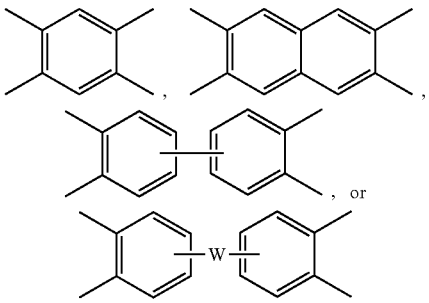
, or wherein W is —O—, —S—, —C(O)—, —SO$_2$—, —S(O)—, —P(R)(=O)— (wherein R is a $C_{1-6}$ alkyl or $C_{6-12}$ aryl), —$C_yH_{2y}$— wherein y is an integer from 1-5 or a halogenated derivative thereof (which includes perfluoroalkylene groups), or a group of the formula T as described in formula (19) below.

Each R in formula (17) is the same or different, and is a substituted or unsubstituted divalent organic group, such as a $C_{6-20}$ aromatic hydrocarbon group or a halogenated derivative thereof, a straight or branched chain $C_{2-20}$ alkylene group or a halogenated derivative thereof, a $C_{3-8}$ cycloalkylene group or halogenated derivative thereof, in particular a divalent group of formulas (18)

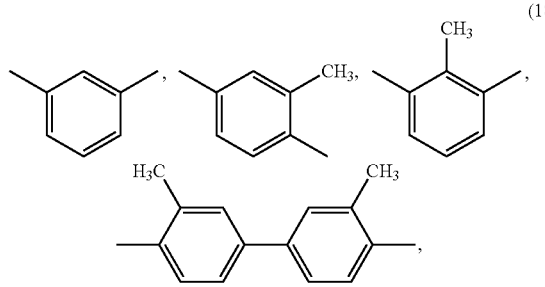
(18)

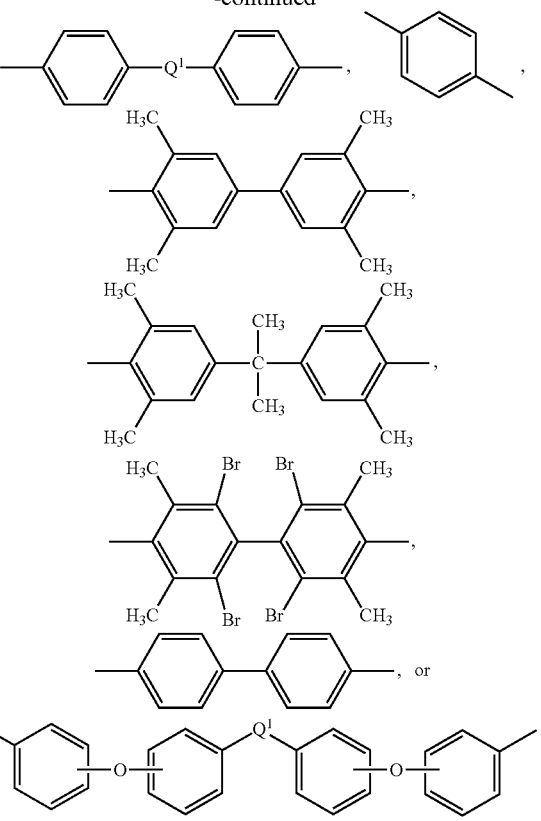

wherein $Q^1$ is single bond, —O—, —S—, —C(O)—, —SO$_2$—, —SO—, —P(R)(=O)—, —$C_yH_{2y}$— wherein y is an integer from 1-5 or a halogenated derivative thereof (which includes perfluoroalkylene groups), or —(C$_6$H$_{10}$)$_z$— wherein z is an integer from 1-4. In an embodiment R is m-phenylene, p-phenylene, or a diaryl sulfone.

Polyetherimides are a class of polyimides that comprise more than 1, for example 10-1000, or 10-500, structural units of formula (19)

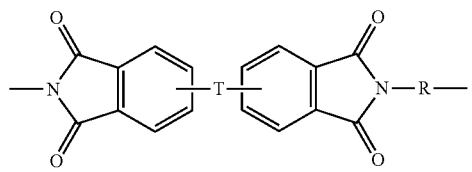
(19)

wherein each R is the same or different, and is as described in formula (17).

Further in formula (19), T is —O— or a group of the formula —O—Z—O— wherein the divalent bonds of the —O— or the —O—Z—O— group are in the 3,3', 3,4', 4,3', or the 4,4' positions. The group Z in —O—Z—O— of formula (1) is a substituted or unsubstituted divalent organic group, and can be an aromatic $C_{6-24}$ monocyclic or polycyclic moiety optionally substituted with 1-6 $C_{1-8}$ alkyl groups, 1-8 halogen atoms, or a combination comprising at least one of the foregoing, provided that the valence of Z is not exceeded. Exemplary groups Z include groups derived from a dihydroxy compound of formula (3) as described above. A specific example of a group Z is a divalent group of formula (20)

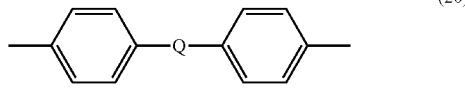

wherein Q is —O—, —S—, —C(O)—, —SO$_2$—, —SO—, —P(R)(=O)— (wherein R is a C$_{1-6}$ alkyl or phenyl), or —C$_y$H$_{2y}$— wherein y is an integer from 1-5 or a halogenated derivative thereof. In a specific embodiment Z is derived from bisphenol A. In an embodiment in formula (19), R is m-phenylene or p-phenylene and T is derived from bisphenol A.

In some embodiments, the polyetherimide can be a copolymer, for example, a polyetherimide siloxane, or a polyetherimide sulfone copolymer comprising structural units of formula (17) wherein at least 50 mol % of the R groups are of formula (18) wherein Q$^1$ is —SO$_2$— and the remaining R groups are independently p-phenylene or m-phenylene or a combination comprising at least one of the foregoing; and Z is 2,2'-(4-phenylene)isopropylidene.

In some embodiments, the polyetherimides have an Mw of 1,000-150,000 grams/mole (Dalton), or 10,000-80,000 Daltons, as measured by gel permeation chromatography, using polystyrene standards. Polyetherimides are commercially available from SABIC as ULTEM, EXTEM, and SILTEM.

In another aspect, the second polymer component in the polymer composition can be a poly(aryl ether sulfone) such as poly(phenylene sulfone) (PPSU) and copolymers thereof. Processes for the preparation of poly(aryl ether sulfone) are described in U.S. Pat. Nos. 4,108,837 and 6,228,970. Poly (aryl ether sulfone) is commercially available from Solvay Advanced Polymers LLC as RADEL® 5000 and can have units of formula (21).

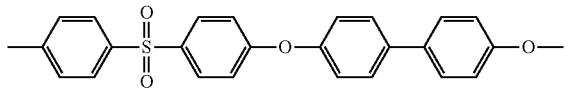

In another aspect, the second polymer component in the polymer composition can be a poly(phenylene sulfide) and copolymers. Processes for the preparation of poly(phenylene sulfide) are described in a number of U.S. Pat. Nos. 4,464,507 and 5,071,949. Poly(phenylene sulfide) is commercially available from Ticona as FORTRON® PPS and can have the general structure (22).

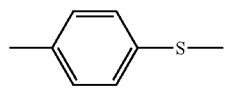

The ratio of the polyisoindolinone to the second polymer component in the polymer composition can be any that results in a polymer composition that has the desired properties. The ratio, in parts by weight, of polyisoindolinone to the second polymer component can be from 1:99 to 99:1, depending on the end use application, and the desired properties. The ratios can be from 15:85 to 85:15 or from 25:75 to 75:25, or from 40:60 to 60:40.

The compositions of the polyisoindolinones, in particular the poly(isoindolinone ether ether ketone)s, can further comprise an additive composition, a filler, a reinforcing agent, or a combination comprising at least one of the foregoing.

An additive composition comprising one or more additives selected to achieve a desired property can be present in the polymer composition, with the proviso that the additives are also selected so as to not significantly adversely affect a desired property of the polymer composition. Additives that have high temperature resistance and low volatility are preferred. In some embodiments, the additives are selected to have a molecular weight of above 500 g/mol. The additive composition or individual additives can be mixed at a suitable time during the mixing of the components for forming the composition. The additive can be soluble or non-soluble in the polyisoindolinone, and can include an anti-drip agent (e.g., a PTFE-encapsulated styrene-acrylonitrile copolymer (TSAN)), anti-fog agent, antimicrobial agent, antioxidant, antistatic agent, blowing agent, colorant (e.g, a dye or pigment), flame retardant, flow modifier, heat stabilizer, impact modifier, light stabilizer, lubricant, nucleating agent, plasticizer, processing aid, release agent (such as a mold release agent), surface effect additive, radiation stabilizer, ultraviolet light stabilizer, ultraviolet light absorber, or a combination comprising one or more of the foregoing. In general, each additive is used in an amount generally known to be effective. For example, the total amount of the additive composition (other than any impact modifier, filler, or reinforcing agent) can be 0.001-10.0 wt %, or 0.01-5 wt %, each based on the total weight of the polymer in the composition.

Specific colorants (pigments) that can be used include titanium dioxide and carbon black. In some embodiments, particularly in compositions have a crystalline phase, nucleating agents such as talc, clay, silica, carbon black, metal salts of long-chain (C16 or higher) carboxylic acids (e.g., sodium stearate, calcium oleate, potassium behenate, aluminum stearate and the like) or any combination thereof may be added. In some embodiments 0.1-1.0% of talc with particle size of less than 5 µm is preferred.

The polymer compositions comprising the polyisoindolinones, the second polymer components, an additive, and optionally a reinforcing agent can be used in the manufacture of a composite. Composites generally contain a polymer composition and a reinforcing agent. As is known in the art, some overlap exists between materials that can be used as fillers and those that can be used as reinforcing agents. In some embodiments a material can function as both a filler and a reinforcing agent. The following lists of fillers and reinforcing agents are exemplary only, and not intended to be exclusive.

Possible fillers include, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as TiO$_2$ (which can also be used as a pigment), aluminum oxide, magnesium oxide, or the like; calcium sulfate (as its anhydride, dihydrate or trihydrate); calcium carbonates such as chalk, limestone, marble, synthetic precipitated calcium carbonates, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polymer matrix, or the like; sulfides such as molybdenum sulfide, zinc sulfide or the like; barium compounds such as barium titanate, barium ferrite, barium sulfate, heavy spar, or the like; particulate organic fillers such as polytetrafluoroethylene, polyimide, or the like; and mica, clay, feldspar, flue dust, fillite, quartz, quartzite, perlite, tripoli, diatomaceous earth, carbon black, or the like. A combination of two or more fillers can be used.

Possible reinforcing agents include, for example, talc, including fibrous, modular, needle shaped, lamellar talc, or the like; mica; clays, including exfoliated nanoclays; single crystal fibers or "whiskers" such as silicon carbide, aluminum oxide, boron carbide, iron, nickel, copper, or the like; fibers (including continuous and chopped fibers) such as asbestos, carbon fibers, glass fibers, such as E, A, C, ECR, R, S, D, or NE glasses, or the like; metals and metal oxides such as fibrous aluminum, bronze, zinc, copper and nickel or the like; flaked fillers such as glass flakes, flaked silicon carbide, aluminum diboride, aluminum flakes, steel flakes or the like; inorganic fibrous materials, for example short inorganic fibers such as potassium titanate fiber, gypsum fiber, aluminum oxide fiber, magnesium oxide fiber, aluminum silicate fiber, and those derived from compositions comprising at least one of aluminum silicates, aluminum oxides, magnesium oxides, and calcium sulfate hemihydrate or the like; or reinforcing organic fibers formed from high-temperature organic polymers capable of forming fibers such as poly(imides), poly(para-phenylene terephthalamide)s, or the like. A combination two or more reinforcing agents can be used.

In some embodiments the reinforcing agent can be provided in the form of monofilament or multifilament fibers and can be used individually or in combination with other types of fiber, for example by co-weaving, core/sheath, side-by-side, orange-type or matrix and fibril constructions, or by other suitable methods. Co-woven structures include glass fiber-carbon fiber, carbon fiber-aromatic polyimide (aramid) fiber, and aromatic polyimide fiberglass fiber or the like. Fibrous fillers can be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids.

Preferred reinforcing agents are fibrous, and include glass fiber (such as E, A, C, ECR, R, S, D, or NE glasses), carbon fiber, polyaramide fiber, poly(p-phenylene-2,6-benzobisoxazole) fiber, carbon microfiber, carbon nanofiber, potassium titanate fiber, gypsum fiber, aluminum oxide fiber, aluminum silicate fiber, magnesium oxide fiber, or a combination comprising at least one of the foregoing fibers.

The fillers and reinforcing agents can be coated with a layer of metallic material to facilitate conductivity, or surface-treated with silanes to improve adhesion and dispersion with the polymer matrix. Fillers and reinforcing agents can be generally used in amounts of 10-200 parts by weight, based on 100 parts by weight of the polymer.

The polyisoindolinone blend compositions (also referred to herein as "polymer compositions" or "blend compositions") can have at least one of the following properties: a crystallinity of 10% or higher, or 20% or higher, as determined by differential scanning calorimetry; or less than 25 wt % solubility at 23° C. in dichloromethane, dichloroethane, or chloroform, when in the form of a melt-pressed film.

The polyisoindolinone blend compositions, in particular the poly(isoindolinone ether ether ketone)s blended with a PEEK can have 10% crystallinity or higher, or 20% crystallinity or higher, as determined using differential scanning calorimetry on the second heat cycle, wherein heating and cooling is at a rate of 20° C./minute for both heating and cooling cycles. Alternatively, the polyisoindolinone compositions, in particular the poly(isoindolinone ether ether ketone)s blended with a PEEK can have less than 10% crystallinity, or less than 5% crystallinity, or no crystallinity for certain applications. The relative ratio of isoindolinone ether ether ketone units (1) to arylene ether ketone units (2) can be adjusted to obtain the desired crystallinity in the polymer compositions.

A melt-pressed film comprising the polymer compositions can be folded 180 degrees greater than 3 times without breaking after autoclaving for 3 days at 130° C. A 150-500 µm- or 300 µm-thick molded sample of the polymer compositions has at least 65% transmission at 850 nm, 1310 nm, or 1550 nm; or a 150-500 µm- or 300 µm-thick molded sample of the polymer compositions has greater than 65% transmission as measured using the color space CIE1931 (Illuminant C and a 2° observer).

The polymer compositions can be immiscible, which have one or more of the following properties: a crystalline melting point of 300-350° C., two glass transitions between 150 and 300° C., or a modulus at 150-300° C. of greater than 300 MPa at 150-500 µm or 300 µm sample thickness measures according to ASTM D5418. The immiscible compositions can comprise a polyisoindolinone and a polymer component comprising a polyarylether ketone, a polybenzimdazole, a polyimide, a poly(aryl ether sulfone), a poly(phenylene sulfide), or a combination comprising at least one of the foregoing. In specific embodiments, the immiscible compositions comprise a poly(isoindolinones ether ether ketone) homopolymer and a polyether ether ketone such as VICTREX PEEK available from Victrex Ltd., where the weight ratio of the poly(isoindolinones ether ether ketone) to the PEEK is 4:1 to 1:4 or 1:1 to 1:4. The poly(isoindolinones ether ether ketone) homopolymer can be derived from N-phenyl phenolphthalein and 4,4'-difluorobenzophenone.

The polymer compositions can be miscible compositions, which have one or more of the following properties: no crystalline melting point, one glass transition temperature between 145 and 300° C., or a modulus at 150-300° C. of greater than 1,000 MPa at 150-500 µm or 300 µm sample thickness measured according to ASTM D5418. The miscible compositions can comprise a polyisoindolinone and a polymer component comprising a polyimide, a poly(aryl ether sulfone), or a combination comprising at least one of the foregoing. In specific embodiments, the miscible compositions comprise a poly(isoindolinones ether ether ketone) copolymer and a polyether ether ketone such as VICTREX PEEK available from Victrex Ltd., where the weight ratio of the poly(isoindolinones ether ether ketone) to the PEEK is 4:1 to 1:4 or 1:1 to 1:4. The poly(isoindolinones ether ether ketone) copolymer can be derived from hydroquinone, N-phenyl phenolphthalein, and 4,4'-difluorobenzophenone. Preferably the poly(isoindolinones ether ether ketone) copolymer comprises greater than 20 mol % of the isoindolinone ether ether ketone units.

The polymer compositions comprising the polyisoindolinones and the polyarylether ketones, including composites, can be used for the manufacture of a wide variety of articles. The article can be in the form of a molded article, a layer (including a sheet or a film), one or more layers of a multilayer (which can contain sheets, films, or a combination thereof), an extruded article, a coating, a pellet, a powder, a foam, a tubing, a fiber, or a flake.

Such articles can be formed by a variety of methods, including molding (e.g., injection molding, blow molding, rotational molding, compression molding, transfer molding, and the like) thermoforming, casting, (e.g. spin-casting, vacuum casting, or dip casting, wax model casting,), pelletizing, coating, fiber spinning, extruding (including to form pellets or a profile), precipitating, 3D printing, and the like.

The articles can be used in a wide variety of applications, including electronic, medical, transportation, and construction. Examples of articles include, but are not limited to, an optical lens, a site glass (also called a water gauge), optical fiber connector, an electrical connector, a light-emitting diode reflector, a printed circuit board substrate, a reflector for automotive headlamp, a component of a fuel system for a gasoline engine, or a diesel engine, an aircraft jet engine, or an aircraft turboprop engine, a fuel bowl, a fuel filter housing, water pump, a housing for a computer monitor, a housing or a handheld electronic device such as a cell phone or tablet computer, a component of a lighting fixture, or a component of a home appliance, industrial appliance, roof, greenhouse, sun rooms swimming pool enclosure, or the like, film, wire coatings, or the like.

EXAMPLES

Materials used in the examples are described in Table 1.

TABLE 1

| Component | Chemical Description (Trade Name) | Source |
|---|---|---|
| PEEK | Polyether ether ketone (VICTREX PEEK 150G) | VICTREX Co. |
| PIEEK-1 | A polyisoindolinone ether ether ketone (PIEEK) homopolymer made by a reaction of a 100 mol % of N-phenyl phenolphthalein with about an equal molar amount of 4,4'-difluorobenzophenone | SABIC |
| PIEEK-2 | A polyisoindolinone ether ether ketone (PIEEK) copolymer made by a reaction of a mixture of about 50 mol % hydroquinone and about 50 mol % of N-phenyl phenolphthalein with about an equal molar amount of 4,4'-difluorobenzophenone | SABIC |
| PIEEK-3 | A polyisoindolinone ether ether ketone (PIEEK) copolymer made by a reaction of a mixture of about 90 mol % hydroquinone and about 10 mol % of N-phenyl phenolphthalein with about an equal molar amount of 4,4'-difluorobenzophenone | SABIC |
| PEI | Polyether imide (ULTEM 1010) | SABIC |
| PPSU | Polyphenylene sulfone (RADEL R-5100) | SOLVAY |

General Procedure for Preparing the PIEEK

In an exemplary procedure, a 500-mL, four-necked reaction kettle equipped with a mechanical stirrer, nitrogen inlet, and a condenser was charged with 36.08 grams (0.1653 moles) of 4,4'-difluorobenzophenone, 65.00 grams (0.1653 moles) of 2-phenyl-3,3-bis(4-hydroxyphenyl)phthalimidine, and 125 grams of diphenyl sulfone. The flask was maintained under inert atmosphere. The reaction mixture was heated to 180° C. to form a colorless, homogenous solution. Then, anhydrous potassium carbonate sieved through a 450 sieve (23.08 grams, 0.1679 moles) was added. The reaction content was then heated to 200° C., and maintained for 1 hour. The temperature was then increased to 250° C., and maintained for 1 hour. Finally, the temperature was raised to 325° C., and maintained for 1 hour. The light colored reaction mixture was then cooled (without end-stopping) and the resulting solid reaction product was milled into a fine powder. The polymer product was purified by washing with acetone (3×), water (3×), and methanol (2×). The resulting polymer powder was dried at 140° C. under vacuum oven.

General Procedure for Preparing Polymer Compositions

The polymer samples used for composition studies were dried, and pre-mixed in a plastic bag with required quantities. The polymer compositions were prepared by extrusion of dry powder mixtures of the polyether ether ketone, PEEK with polyisoindolinone ether-ketone (PIEEK) in a Haake Rheomix Lab Mixers from PolyLab using two roller blades. Compositions are listed in wt % of the total composition. The Haake mixing bowl was set at about 380-385° C. The compositions were run at about 40-60 rpm under inert atmosphere of nitrogen. The materials were mixed in the molten state for 5-15 min. The resulting molten polymer mass was removed from Haake to obtain a polymer mass. The polymer mass was then converted into smaller chunks/pellets using a grinder, and used for testing.

Films comprising the polymers or polymer compositions of the Examples were made by melt-pressing a polymer sample at a temperature above 350° C. using Automatic Bench Top Lab Press from Carver, Inc. Films were dried at 100° C. before testing.

Testing Methods

Unless indicated otherwise, all test methods are those in effect on the earliest priority date of this application.

Differential scanning calorimetry (DSC) was used to determine glass transition temperature (Tg) and melting point temperature (Tm) per ASTM test D3418. The test was performed using a TA Q1000 DSC instrument. In a typical procedure, a polymer sample (10-20 mg) was heated from 40° C. to 400° C. (20° C./min), held at 400° C. for 1 min, cooled back to 40° C. (20° C./min), then held at 40° C. for 1 min, and the above heating/cooling cycle was repeated. The second heating cycle is usually used to obtain the Tg and Tm.

Thermal gravimetric analysis (TGA) measurements were performed with a TA Q800 TGA. The samples were scanned from 40° C. to 800° C. under nitrogen and air with a heating rate of 20° C./min. This analysis was also used to determine the temperature of peak decomposition (also referred as the onset decomposition temperature), and char yield at the end of TGA run (at 800° C. under nitrogen).

The coefficient of thermal expansion (CTE) was analyzed to assess the dimensional stability of the polymers. CTE was measured using a thermo-mechanical analysis.

Thermal mechanical analysis (TMA) was performed on a Q400 instrument with a temperature range of 50° C. to 170° C., and 5° C./min ramp rate. The CTE was calculated using the slope of a linear fit to the TMA curve between 50° C. and 170° C. The CTE were measured on melt-pressed films.

Modulus was determined according to ASTM D5418 on a 150-500 μm sample at the indicated temperatures.

Dynamic mechanical analysis (DMA) was performed on a TA instrument 2980 DMA, and the scanning temperature range was from 40° C. to 400° C. at a heating rate of 2° C./min and at a frequency of 1 Hz. It was run using the Tensile Fixture. A three-point bending mode was employed and the specimen size was 10.0-15.0×3.0-5.0×0.15-0.40 mm. The storage modulus (G'), loss modulus (G") and tangent of loss angle (tan δ) were obtained as the function of scanning temperature.

The percent transmission of the polymer disc was measured using Perkin Elmer LAMBDA 950 across the 400 nm (UV) to 1600 nm (NIR) range. The discs used for measurement had thickness of 150-500 μm as per ASTM D1003

Procedure for solvent resistance test: the polymer film was cut to a size of 15 mm×10 mm. The film was dried in a vacuum oven at 140° C. for 24 hours. Following cooling to a room temperature under vacuum, the sample was quickly weighed into a 20 mL scintillation vial (recorded as M3). The solvent was added (10 mL) to the vial. The vial was then placed on a shaker for 24 hours and the polymer sample was removed from the solvent. The film was then dried in vacuum oven at 140° C. to remove residual solvents and weighed again (recorded at M4) at room temperature. The percent loss of polymer was measured using the formula: % loss=(M3−M4)*100/M3.

Water uptake measurements: Samples of the cured polymer films were cut to a size of at least 2 centimeters×2 centimeters and weighed. The weight was recorded as M1. The samples were dried in a vacuum oven at 140° C. for 24 hours. Following cooling to room temperature under vacuum, the samples were quickly weighed (recorded as M2) and immersed in DI water for 24 hours. The samples were removed from the water, wiped dry, and weighed again (recorded as M3). The water absorption was calculated using the formula: Water absorption (%)=(M3−M2)*100/M2.

Hydrostability Measurement by fold test: The polymer film obtained from melt-pressing having thickness 150-500 μm were cut to a size 80 mm×50 mm, and were subjected to heating in an autoclave for 3 days at 130° C. After exposure, the films were dried in an oven at 100° C., and tested for its mechanical properties by subjecting to a fold test. The fold performance was ranked based number of fold the film allows before it breaks at the crease. The ranking is as follows: Highly Creasable (HC) if more than 7 folds; Moderately Creasable (MC) if more than 3 but less than 7 folds, and Poorly Creasable (LC) if less than 3 folds before breaking.

PIEEK blends with PEEK are shown by the data in the Table 2, Examples 1-6, which compare the properties of PEEK versus the properties of compositions of polyisoindolinones and PEEK. PIEEK/PEI blends and PIEEK/PPSU blends are shown by the data in Table 3. Examples 7-10, which compare the properties of the blends versus the properties of 100% PEI or 100% PPSU. The formulations and the results are shown in Tables 2-5 as well as FIGS. 1, 2, and 3. Examples 1 and 2 show PEEK with 50 and 75 wt % of PIEEK-1 homopolymer. Examples 3 and 4 are blends of the PIEEK-2 isoindolinone hydroquinone copolymer with PEEK. Examples 5 and 6 are blends of PIEEK-3 isoindolinone hydroquinone copolymer with PEEK. Comparative Example A is the unblended PEEK.

TABLE 2

PIEEK-PEEK Blends

| Component | Example 1 | Example 2 | Example 3 | Example 4 | Example 5 | Example 6 | Comparative Example A |
|---|---|---|---|---|---|---|---|
| PEEK (wt %) | 50 | 25 | 50 | 25 | 50 | 25 | 100 |
| PIEEK-1 (wt %) | 50 | 75 | — | — | | | — |
| PIEEK-2 (wt %) | — | — | 50 | 75 | | | — |
| PIEEK-3 (wt %) | | | | | 50 | 75 | — |
| Tm (20° C./min) | 339 | 324 | 324 | none | 337 | 330 | 341 |
| Heat of fusion J/g | 14.7 | 0.7 | 8.7 | none | 43.3 | 43.5 | 48.3 |
| Tc (20° C./min) | 282 | none | none | none | 282 | 264 | 301 |
| Heat Crystallization J/g | −18.1 | none | none | none | −47.4 | −44.2 | −50 |
| Tg 1 (° C.) by DSC | 166 | 213 | 170 | 187 | 151 | 152 | 143-147 |
| Tg 2 (° C.) by DSC | 221 | one Tg | one Tg | one Tg | 230 | 231 | one Tg |
| TGA in $N_2$ (Onset T,° C.) | 526 | 510 | 515 | 510 | 576 | 588 | 594 |
| % Total Weight loss | 48.0 | 47.7 | 55.2 | 50.4 | 51.8 | 51.9 | 51 |
| CTE (μm/m. ° C.) | 47 | 54 | 51 | 50 | 54 | — | 50-140 |
| % T at 850 nm, | 83 | 75.9 | 65.8 | 77.9 | 66.7 | 72.7 | 23.8 |
| 1310 nm, | 83 | 78.0 | 78.7 | 83.8 | 79.5 | 82.2 | 41.0 |
| 1550 nm | 83.3 | 78.5 | 80 | 84.4 | 81.2 | 83.7 | 45.1 |
| Film thickness (μm) | 230 | 380 | 190 | 430 | — | — | 770 |
| Water absorption (23° C., sat) (%) | 5.06 | 1.99 | 2.63 | 1.25 | 0.92 | 0.90 | — |
| % solubility in dichloromethane | <0.5 | <0.5 | 2.19 | 4.64 | 2.62 | <0.5 | — |
| % solubility in chloroform | 1.39 | 8.52 | 7.53 | 8.96 | <0.5 | <0.5 | — |
| % solubility in ortho-dichlorobenzene | 8.41 | 12.90 | 10.03 | 15.34 | 0.86 | 9.98 | — |

TABLE 3

PIEEK-PEI Blends and PIEEK-PPSU Blends

| Component | Example 7 | Example 8 | Example 9 | Example 10 | Comparative Example B | Comparative Example C |
|---|---|---|---|---|---|---|
| PEI (wt %) | 50 | 25 | — | — | 100 | — |
| PPSU (wt %) | — | — | 50 | 25 | — | 100 |
| PIEEK-3 (wt %) | 50 | 75 | 50 | 75 | — | — |
| Tm (20° C./min) | none | none | 301 | 302 | none | none |
| Heat of fusion J/g | 2.4 | 25.9 | 0.9 | 26.8 | none | none |
| Tg 1 (° C.) by DSC | 176 | 157 | 174 | 149 | 217 | 220 |
| Tg 2 (° C.) by DSC | one Tg | one T g | one T g | one T g | one Tg | one Tg |

TABLE 3-continued

PIEEK-PEI Blends and PIEEK-PPSU Blends

| Component | Example 7 | Example 8 | Example 9 | Example 10 | Comparative Example B | Comparative Example C |
|---|---|---|---|---|---|---|
| TGA in $N_2$ (Onset T,° C.) | 540 | 536 | 553 | 555 | — | — |
| % Total Weight loss | 59.8 | 66.8 | 59.3 | 57.2 | — | — |
| % T at 850 nm, | 74.1 | 67.0 | 77.2 | 71.4 | — | — |
| 1310 nm, | 84.2 | 82.6 | 84.8 | 83.9 | — | — |
| 1550 nm | 85.2 | 84.3 | 85.7 | 84.4 | — | — |
| Film Thickness (μm) | — | — | — | — | — | — |
| Water absorption (23° C., sat) (%) | 1.51 | 0.84 | 2.07 | 1.52 | 0.25 | 0.37 |
| % solubility in dichloromethane | 71.76 | 22.65 | 63.16 | 17.4 | — | — |
| % solubility in chloroform | — | 32.69 | 74.79 | 31.54 | — | — |
| % solubility in dichlorobenzene | 38 76 | 7.44 | 13.42 | 2.90 | — | — |

The glass transition temperature (Tg) of these compositions were measured to assess the heat performance of the resulting material. As can be seen from Table 2, Examples 1, 5, and 6 show two Tg, indicating phase separated polymer compositions. However, Example 2, 3, and -4 showed only one Tg, indicating the formation of miscible compositions with PEEK. Further, the rate of crystallization for various PIEEK-PEEK compositions were also measured with cooling rate of 20° C./min. Example 1 showed a crystallization temperature (Tc) above 282° C., and crystalline melting point (Tm) of 338° C., Example 5 showed a crystallization temperature (Tc) above 282° C., and crystalline melting point (Tm) of 337° C., and Example 6 showed a crystallization temperature (Tc) above 264° C., and crystalline melting point (Tm) of 330° C. whereas Examples 2-4 did not show any detectable Tc crystallization when cooled at 20° C./min. Example 3 did show slight crystalline melting point at 322° C.

The thermogravimetric analysis of Examples 1-6 and control showed an onset decomposition temperature of greater than 500° C., and % total weight loss under inert atmosphere of nitrogen between 47 and 55%. The test demonstrated that examples 1-6 not only have good thermal stability but also good flame resistance, and the potential for high char formation.

Also, the melt-pressed films from examples 1-6 were found to be highly creasable. They had good creasability (HC) and did not crack or break after repeated (more than 7 times) flexing back on themselves.

The percent transmission of the films was also measured. Examples 1-6 had % T of more than 65% at 850 nm, 1310 nm, and 1550 nm, indicating that these compositions have good transparency. On the other hand, the control example shows lower % transmission, in the range of 20-45%. The blends showed substantially no blue phosphorescence in response to irradiation with ultraviolet light of 320-400 nm. The films of the blends were insoluble in in dichloromethane, ortho-dichlorobenzene, or chloroform, showing less than 25 wt % loss at 23° C. after 24 hours, which is indicative of good chemical resistance, even in these aggressive chlorinated solvents.

Figure 2:
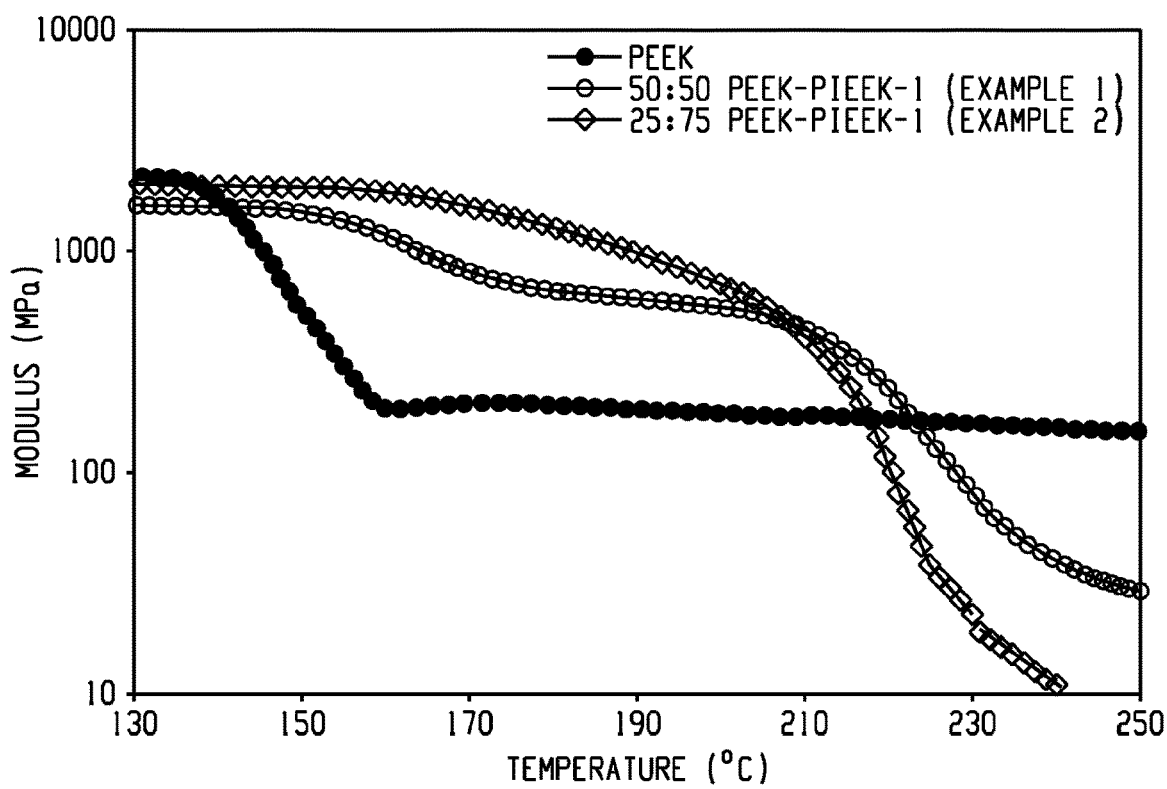
FIG. 2: is plot showing modulus vs. temperature of immiscible PIEEK/PEEK compositions.

FIG. 1 shows the high temperature (130-240° C.) modulus of all the PIEEK compositions compared to PEEK with no polyisoindolinone. Table 4 and FIG. 2 show the high temperature modulus of the PIEEK-1 homopolymer blends with PEEK. At 141-210° C. the blends show increase stiffness, higher flexural modulus, than the PEEK comparative example A. From 141-210° C. the PIEEK-1 blend modulus is above 400 MPa.

TABLE 4

High Temperature Modulus Data for PIEEK-PEEK Blends

| | Modulus (MPa) | | |
|---|---|---|---|
| Temp (° C.) | PEEK | 50:50 PEEK-PIEEK-1 (Example 1) | 25:75 PEEK-PIEEK-1 (Example 2) |
| 145 | 1068 | 1570 | 1952 |
| 150 | 531 | 1505 | 1935 |
| 160 | 201 | 1145 | 1826 |
| 170 | 206 | 822 | 1533 |
| 180 | 204 | 684 | 1258 |
| 190 | 194 | 621 | 1010 |
| 200 | 187 | 562 | 745 |
| 210 | 181 | 448 | 454 |
| 220 | 175 | 240 | 110 |

Figure 3:
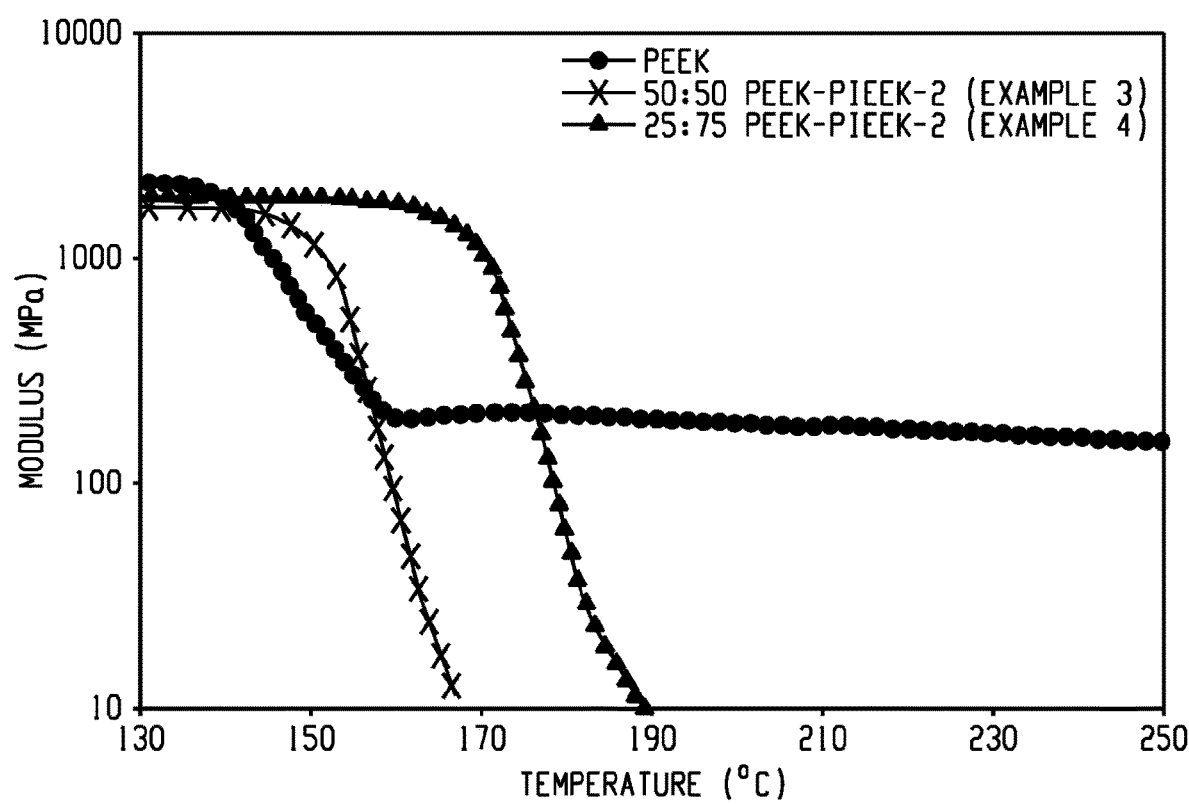
FIG. 3 is plot showing modulus vs. temperature of miscible PIEEK/PEEK compositions.

Table 5 and FIG. 3 show the high temperature modulus of the PIEEK-2 hydroquinone copolymer blends with PEEK. The blends show increased stiffness above 145° C. than the PEEK comparative example A. At 150° C. modulus is above 1000 MPa for both blends.

TABLE 5

High Temperature Modulus Data for PIEEK-PEEK Blends

| | Modulus (MPa) | | |
|---|---|---|---|
| Temp (° C.) | PEEK | 50:50 PEEK-PIEEK-2 (Example 3) | 25:75 PEEK-PIEEK-2 (Example 4) |
| 145 | 1068 | 1480 | 1897 |
| 150 | 531 | 1152 | 1865 |
| 160 | 201 | 84 | 1744 |
| 170 | 206 | 7 | 1041 |

As shown in Tables 2 and 4 and FIG. 1, the immiscible compositions of PIEEK and PEEK have a crystalline melting point of 300-350° C., two glass transitions between 150 and 300° C., and a modulus at 150-300° C. of greater than 300 MPa at 150-500 μm sample thickness measure according to ASTM D5418.

The data in Tables 3 and 5 and FIG. 2 indicate that the miscible compositions of PIEEK and PEEK have no crystalline melting point, one glass transition temperature of 150-300° C., and a modulus at 150-300° C. of greater than 1,000 MPa at 150-500 μm, or 300-μm sample thickness measured according to ASTM D5418.

As can be seen from Table 3, Examples 7-10 showed only one Tg, indicating the formation of miscible compositions of PEI or PPSU with PEEK.

The thermogravimetric analysis of Examples 7-10 showed an onset decomposition temperature of greater than 500° C., and % total weight loss under inert atmosphere of nitrogen between 57 and 67%.

Also, the melt-pressed films from examples 7-10 were found to be highly creasable. They had good creasability (HC) and did not crack or break after repeated (more than 7 times) flexing back on themselves.

The percent transmission of the films was also measured. Examples 7-10 had % T of more than 70% at 850 nm, 1310 nm, and 1550 nm, indicating that these compositions have good transparency.

The invention is further illustrated by the following non-limiting Embodiments.

Embodiment 1

A polymer composition comprising, based on the total weight of the polymers: 1-99 wt %, preferably 10-90 wt %, of a polymer component comprising a polyarylether ketone, a polybenzimdazole, a polyimide, a poly(aryl ether sulfone), a poly(phenylene sulfide), or a combination comprising at least one of the foregoing; and 1-99 wt %, preferably 10-90 wt %, of a polyisoindolinone, wherein the polyisoindolinone comprises: 1-100 mol %, preferably 5-100 mol %, of isoindolinone ether ketone units of the formula (1) wherein each $R^1$ is independently the same or different, and is hydrogen, $C_{1-8}$ alkyl, $C_{3-8}$ cycloalkyl, or phenyl optionally substituted with 1-5 $C_{1-6}$ alkyl groups, each $R^a$ is independently the same or different, and is $C_{1-6}$ alkyl, each $R^b$ is independently the same or different, and is $C_{1-12}$ alkyl, $C_{2-12}$ alkenyl, $C_{3-8}$ cycloalkyl, or $C_{1-12}$ alkoxy, each $R^c$ is independently the same or different, and is $C_{1-12}$ alkyl, $C_{2-12}$ alkenyl, $C_{3-8}$ cycloalkyl, or $C_{1-12}$ alkoxy, each p, q, and r is independently the same or different, and is an integer of 0-4, preferably 0-2, and x is an integer of 1-4, preferably 1-3, preferably 1 or 2; and 0-99 mol %, preferably 0-95 mol %, of arylene ether ketone units of the formula (2) wherein each $R^2$ is independently the same or different, and is a $C_{6-30}$ substituted or unsubstituted arylene, each $R^c$ is independently the same or different, and is $C_{1-12}$ alkyl, $C_{2-12}$ alkenyl, $C_{3-8}$ cycloalkyl, or $C_{1-12}$ alkoxy, each r is independently the same or different, and is an integer of 0-4, preferably 0-2, and x is an integer of 1-4, preferably 1-3, preferably 1 or 2; and wherein when the polyisoindolinone is a poly(isoindolinone ether ether ketone), it has a least one, preferably at least two, preferably all of the following properties: a glass transition temperature greater than 145° C., or 145-270° C. as determined by differential scanning calorimetry, ° C. or substantially no blue phosphorescence in response to irradiation with ultraviolet light of 320-400 nm.

Embodiment 2

The polymer composition of Embodiment 1, wherein the composition has at least one of: a crystallinity of 10% or higher, as determined by differential scanning calorimetry; or less than 25 wt % solubility at 23° C. in dichloromethane, dichloroethane, or chloroform, when in the form of a melt-pressed film.

Embodiment 3

The polymer composition of Embodiments 1 or Embodiments 2, further having at least one, or all of the following properties: sufficient toughness wherein a melt-pressed film of 300 micrometer thickness can be folded 180 degrees greater than 3 times without breaking; or sufficient hydrostability wherein a melt-pressed film of 300 micrometer-thickness can be folded 180 degrees more than 3 times without breaking after autoclaving for 3 days at 130° C.; or a modulus greater than 1000 MPa at 150-300° C., as measured by ASTM D5418, on a 300 micrometer-thick film sample.

Embodiment 4

The polymer composition of any one or more of Embodiments 1-3, wherein a 300 micrometer-thick molded sample of the polymer composition has at least 65% transmission at 850 nm, 1310 nm, or 1550 nm; or a 300 micrometer-thick molded sample of the polymer composition has greater than 65% transmission as measured using the color space CIE1931 (Illuminant C and a 2° observer).

Embodiment 5

The polymer composition of any one or more of Embodiments 1-4, wherein the polyarylether ketone is a poly(ether ether ketone), a poly(ether ketone), a poly(ether ketone ketone), a poly(ketone ether ketone ketone), or a combination comprising at least one of the foregoing.

Embodiment 6

The polymer composition of Embodiment 5, wherein the polyarylether ketone comprises a repeating unit of the formulas (10), (11), (12), (13), or (14), or a combination comprising at least one of the foregoing.

Embodiment 7

The polymer composition of any one or more of Embodiments 1-6, wherein the composition is an immiscible composition that has at least one, at least two, or all of the following properties: a crystalline melting point of 300-350° C.; two glass transitions between 150 and 300° C.; or a modulus at 150-300° C. of greater than 300 MPa at a 300 micrometer sample thickness measured according to ASTM D5418, preferably wherein the polymer component comprises a polyarylether ketone, a polybenzimdazole, a polyimide, a poly(aryl ether sulfone), a poly(phenylene sulfide), or a combination comprising at least one of the foregoing.

Embodiment 8

The polymer composition of any one or more of Embodiments 1-6, wherein the composition is a miscible composition that has at least one, preferably two, or all of the following properties: no crystalline melting point; one glass transition temperature between 145 and 300° C.; or a modulus at 150-300° C. of greater than 1,000 MPa at a 300 micrometer sample thickness measured according to ASTM D5418, preferably wherein the polymer component comprises a polyimide, a poly(aryl ether sulfone), or a combination comprising at least one of the foregoing.

Embodiment 9

The polymer composition of any one or more of Embodiments 1-8, wherein the polyisoindolinone further has at least one, at least two, at least three, or all of the following properties: less than 25 ppm of benzylic protons of the polyisoindolinone; a hydroxyl polymer end group content of less than 700 ppm of the polyisoindolinone; a halogen content of less than 900 ppm of the polyisoindolinone; a residual alkali or alkaline earth metal cation content of less than 500 ppm of the polyisoindolinone; a residual solvent content of less than 500 ppm of the polyisoindolinone.

Embodiment 10

The polymer composition of any one or more of Embodiments 1-9, wherein the polyisoindolinone further has at least one, at least two, at least three, or all of the following properties: a weight average molecular weight of at least 15,000 Daltons, preferably 20,000-100,000 Daltons, more preferably 20,000-60,000 Daltons; an onset decomposition temperature of greater than 485° C. as determined using thermogravimetric analysis in nitrogen; a coefficient of thermal expansion of 30-90 ppm/° C., or 30-60 ppm/° C., or 40-60 ppm/° C., as determined according to ASTM E831; greater than 10% crystallinity, as determined using differential scanning calorimetry on the second heat cycle, wherein heating and cooling is at a rate of 20° C./minute for both heating and cooling cycles.

Embodiment 11

The polymer composition of any one or more of Embodiments 1-10, wherein the polyisoindolinone has the following properties: a 300 micrometer-thick film of the polyisoindolinone has at least 65% transmission at 850 nm, 1310 nm, or 1550 nm as measured on an ultraviolet-visible/near infrared spectrophotometer; or a 300 micrometer-thick film sample has greater than 65% transmission as measured using the color space CIE1931 (Illuminant C and a 2° observer).

Embodiment 12

The polymer composition of any one or more of Embodiments 1-11, wherein the polyisoindolinone further has at least one, or at least two of the following properties: a water uptake of less than 3 percent, preferably less than 1 percent, most preferably less than 0.6 percent at 23° C., after 24 hours by direct immersion; a shift in melt viscosity of less than 30% over 30 min at 380 C under a nitrogen atmosphere as measured in a small amplitude oscillatory time sweep rheology at a fixed angular frequency of 10 radians/second; or a char yield of greater than 30 wt %, as determined using thermogravimetric analysis under inert atmosphere of nitrogen.

Embodiment 13

The polymer composition of any one or more of Embodiments 1-12, wherein a melt-pressed film of the polyisoindolinone can be folded 180 degrees greater than 3 times without breaking after autoclaving for 3 days at 130° C.

Embodiment 14

The polymer compositions of any one or more of Embodiments 1-13, wherein the polyisoindolinone comprises up to 99 mol %, preferably 1-95 mol %, preferably 5-90 mol %, of the arylene ether ketone units.

Embodiment 15

The polymer composition of any one or more of Embodiments 1-14, wherein in the polyisoindolinone $R^2$ is a $C_{6-30}$ substituted or unsubstituted arylene of formula (3) wherein each $R^e$ is independently the same or different, and is $C_{1-12}$ alkyl, $C_{2-6}$ alkenyl, $C_{3-6}$ cycloalkyl, or $C_{1-6}$ alkoxy, each t is independently the same or different, and is an integer of 0-4, each u is independently the same or different, and is an integer of 0-4, and $X^a$ is a single bond, —O—, —S—, —S(=O)—, —S(=O)$_2$—, —C(=O)—, —P(R)(=O)— wherein R is a $C_{1-8}$ alkyl or $C_{6-12}$ aryl, or a $C_{1-18}$ organic bridging group.

Embodiment 16

The polymer composition of any one or more of Embodiments 1-15, wherein $R^2$ is derived from p-hydroquinone, methyl hydroquinone, dimethyl hydroquinone, tert-butyl hydroquinone, di-tert-butyl hydroquinone, resorcinol, 4,4'-biphenol, 4,4'-dihydroxydiphenyl ether, 4,4'-isopropylidenediphenol, 4,4'-(hexafluoroisopropylidene)diphenol, bis(3,5-dimethyl-4-hydroxyphenyl)isopropylidene, bis(4-hydroxyphenyl) sulfoxide, bis(4-hydroxyphenyl) sulfone, bis(4-hydroxyphenyl) sulfide, bis(3,5-dimethyl-4-hydroxyphenyl) sulfone, 4,4'-(1-phenylethylidene)bisphenol, 4,4'-dihydroxybenzophenone, 1,4-bis-(p-hydroxybenzoyl)benzene, 1,3-bis-(p-hydroxybenzoyl)benzene, or a combination comprising at least one of the foregoing.

Embodiment 17

The polymer composition of any one or more of Embodiments 1-16, wherein $R^1$ is hydrogen, $C_{1-6}$ alkyl, $C_{3-6}$ cycloalkyl, or phenyl optionally substituted with 1-3 $C_{1-6}$ alkyl groups; $R^a$ is $C_{1-4}$ alkyl; each $R^b$ is independently the same or different, and is $C_{1-6}$ alkyl, $C_{2-6}$ alkenyl, $C_{3-6}$ cycloalkyl, or $C_{1-6}$ alkoxy; each $R^c$ is independently the same or different, and is $C_{1-6}$ alkyl, $C_{2-6}$ alkenyl, $C_{3-8}$ cycloalkyl, or $C_{1-12}$ alkoxy; each $R^e$ is independently the same or different, and is $C_{1-6}$ alkyl, $C_{2-6}$ alkenyl, $C_{3-6}$ cycloalkyl, or $C_{1-6}$ alkoxy; each p, q, r, and t is independently the same or different, and is an integer of 0 or 1, preferably 0; each u is independently 0 or 1; and each x is independently the same or different, and is an integer of 1-4, preferably 1-3, more preferably 1 or 2.

Embodiment 18

The polymer composition of any one of Embodiments 1-17 further comprising an additive, particulate filler, reinforcing agent, or a combination comprising at least one of the foregoing.

Embodiment 19

An article comprising the polymer composition of any one or more of Embodiments 1-18, preferably wherein the article is a molded article, a layer, one or more layers of a multilayer, an extruded article, a coating, a pellet, a powder, a foam, a tubing, a fiber, or a flake; preferably wherein the article is an optical lens, a site glass, optical fiber connector, an electrical connector, a light-emitting diode reflector, a printed circuit board substrate, a reflector for automotive headlamp, a component of a fuel system for a gasoline engine, or a diesel engine, an aircraft jet engine, or an aircraft turboprop engine, a fuel bowl, or a fuel filter housing, or a water pump.

Embodiment 20

A method of forming the article Embodiment 19, comprising shaping, extruding, molding, or injection molding the polymer composition of any one or more of Embodiments 1-18.

The singular forms "a," "an," and "the" include plural referents. "Or" means "and/or." The endpoints of all ranges directed to the same component or property are inclusive and independently combinable. Technical and scientific terms used herein have the same meaning as is commonly understood by one of skill in the art to which this invention belongs. A "combination" is inclusive of blends, mixtures, alloys, reaction products, and the like.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "hydrocarbyl" and "hydrocarbon" refers broadly to a substituent comprising carbon and hydrogen, optionally with 1-3 heteroatoms, for example, oxygen, nitrogen, halogen, silicon, sulfur, or a combination thereof; "alkyl" is a straight or branched chain, saturated monovalent hydrocarbon group; "alkylene" is a straight or branched chain, saturated, divalent hydrocarbon group; "alkylidene" is a straight or branched chain, saturated divalent hydrocarbon group, with both valences on a single common carbon atom; "alkenyl" is a straight or branched chain monovalent hydrocarbon group having at least two carbons joined by a carbon-carbon double bond; "cycloalkyl" is a non-aromatic monovalent monocyclic or multicyclic hydrocarbon group having at least three carbon atoms; "cycloalkylene" is a divalent group formed by the removal of two hydrogen atoms from two different carbon atoms on one or more rings of a cycloalkyl group; "aryl" is an aromatic monovalent group containing only carbon in the aromatic ring or rings; "arylene" is an aromatic divalent group containing only carbon in the aromatic ring or rings; "alkylarylene" is an aryl group that has been substituted with an alkyl group as defined above, with 4-methylphenyl being an exemplary alkylarylene group; "arylalkylene" is an alkyl group that has been substituted with an aryl group as defined above, with benzyl being an exemplary arylalkylene group; "acyl" is an alkyl group as defined above with the indicated number of carbon atoms attached through a carbonyl carbon bridge (—C(=O)—); "alkoxy" is an alkyl group as defined above with the indicated number of carbon atoms attached through an oxygen bridge (—O—); and "aryloxy" is an aryl group as defined above with the indicated number of carbon atoms attached through an oxygen bridge (—O—).

The term "substituted" means that at least one hydrogen on an atom or group is replaced with another group or combination of groups, provided that the atom's normal valence is not exceeded, and that the substitution does not significantly adversely affect synthesis or use of the polymers. Groups that can be present on a substituted position include nitro (—NO$_2$), cyano (—CN), C$_{2-6}$ alkanoyl (e.g., acyl (H$_3$CC(=O)—); C$_{1-6}$ or C$_{1-3}$ alkyl; C$_{3-8}$ or C$_{3-6}$ cycloalkyl; C$_2$-6 or C$_{2-4}$ alkenyl; C$_2$-6 or C$_{2-4}$ alkynyl; C$_{1-6}$ or C$_{1-3}$ alkoxy; C$_{6-10}$ aryloxy; C$_{1-6}$ alkylthio; C$_{1-6}$ or C$_{1-3}$ alkylsulfinyl; C$_{1-6}$ or C$_{1-3}$ alkylsulfonyl; aminodi(C$_{1-6}$ or C$_{1-3}$)alkyl; C$_{6-12}$ aryl having at least one aromatic ring (e.g., phenyl, biphenyl, or naphthyl, where each ring is optionally substituted); C$_{7-19}$ arylalkylene with 1-3 separate or fused rings and 6-18 ring carbon atoms (e.g, benzyl); or arylalkoxy with 1-3 separate or fused rings and 6-18 ring carbon atoms.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives are available without departing from the spirit and scope of the claims.

What is claimed is:

1. A polymer composition comprising, based on the total weight of the polymers:
    1-99 weight percent of a polymer component comprising a polyarylether ketone, a polybenzimdazole, a polyimide, a poly(aryl ether sulfone), a poly(phenylene sulfide), or a combination comprising at least one of the foregoing; and
    1-99 weight percent of a polyisoindolinone, wherein the polyisoindolinone comprises:
    1-100 mole percent of isoindolinone ether ketone units of the formula

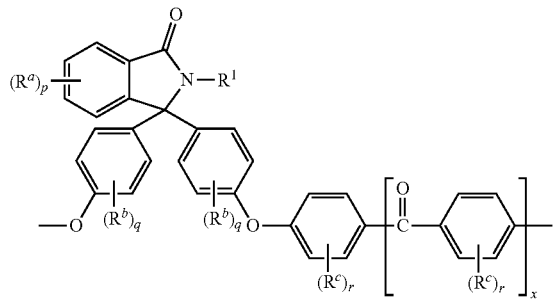

wherein
    each R$^1$ is independently the same or different, and is hydrogen, C$_{1-8}$ alkyl, C$_{3-8}$ cycloalkyl, or phenyl optionally substituted with 1-5 C$_{1-6}$ alkyl groups,
    each R$^a$ is independently the same or different, and is C$_{1-6}$ alkyl,
    each R$^b$ is independently the same or different, and is C$_{1-12}$ alkyl, C$_{2-12}$ alkenyl, C$_{3-8}$ cycloalkyl, or C$_{1-12}$ alkoxy,
    each R$^c$ is independently the same or different, and is C$_{1-12}$ alkyl, C$_{2-12}$ alkenyl, C$_{3-8}$ cycloalkyl, or C$_{1-12}$ alkoxy,
    each p, q, and r is independently the same or different, and is an integer of 0-4, and
    x is an integer of 1-4; and
0-99 mole percent of arylene ether ketone units of the formula

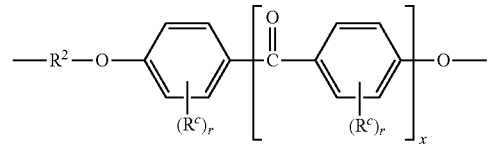

wherein
    each R$^2$ is independently the same or different, and is a C$_{6-30}$ substituted or unsubstituted arylene,
    each R$^c$ is independently the same or different, and is C$_{1-12}$ alkyl, C$_{2-12}$ alkenyl, C$_{3-8}$ cycloalkyl, or C$_{1-12}$ alkoxy,
    each r is independently the same or different, and is an integer of 0-4, and
    x is an integer of 1-4; and wherein when the polyisoindolinone is a poly(isoindolinone ether ether ketone), it has a least one of the following properties:
  a glass transition temperature greater than 150° C. as determined by differential scanning calorimetry, or
  less than 25 weight percent solubility at 23° C. in dichloromethane, orthodichlorobenzene, or chloroform.

2. The polymer composition of claim 1, wherein the composition has at least one of:
  a crystallinity of 10 percent or higher, as determined by differential scanning calorimetry; or
  less than 20 weight percent solubility at 23° C. in dichloromethane, dichloroethane, or chloroform, when in the form of a melt-pressed film.

3. The polymer composition of claim 1, wherein
  a melt-pressed film of 300 micrometer thickness can be folded 180 degrees greater than 3 times without breaking; or
  a melt-pressed film of 300 micrometer-thickness can be folded 180 degrees more than 3 times without breaking after autoclaving for 3 days at 130° C.; or
  the polymer composition has a modulus greater than 1000 MPa at 150-300° C., as measured by ASTM D5418, on a 300 micrometer-thick film sample.

4. The polymer composition of claim 1, wherein
  a 300 micrometer-thick molded sample of the polymer composition has at least 70% transmission at 850 nm, 1310 nm, or 1550 nm, as measured on an ultraviolet-visible/near infrared spectrophotometer; or
  a 300 micrometer-thick molded sample of the polymer composition has greater than 70% transmission as measured using the color space CIE1931 (Illuminant C and a 2° observer).

5. The polymer composition of claim 1, wherein the polyarylether ketone is a poly(ether ether ketone), a poly(ether ketone), a poly(ether ketone ketone), a poly(ketone ether ketone ketone), or a combination comprising at least one of the foregoing.

6. The polymer composition of claim 5, wherein the polyarylether ketone comprises a repeating unit of the formulas

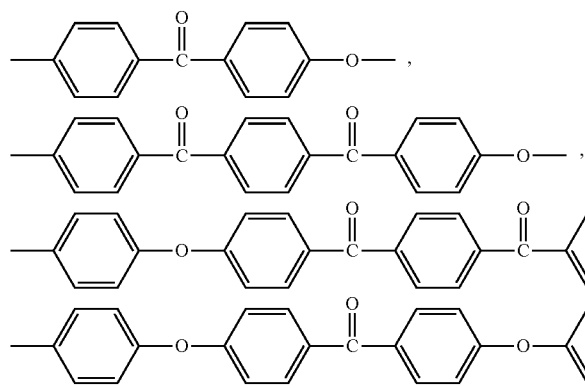

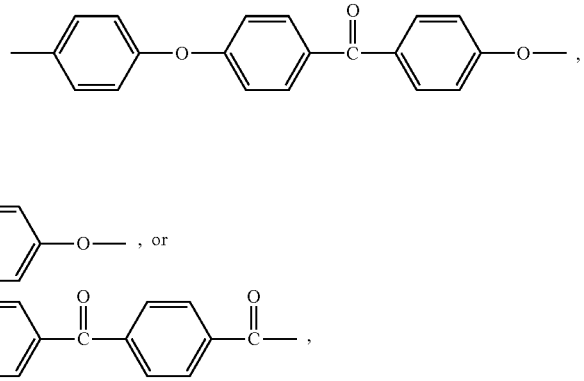

or a combination comprising at least one of the foregoing.

7. The polymer composition of claim 1, wherein the composition is an immiscible composition that has the following properties:
  a crystalline melting point of 300-350° C.,
  two glass transitions between 150 and 300° C., or
  a modulus at 150 to 300° C. of greater than 300 MPa at a 300 micrometer sample thickness measured according to ASTM D5418.

8. The polymer composition of claim 1, wherein the composition is a miscible composition that has at least one of the following properties:
  no crystalline melting point;
  one glass transition temperature between 150 and 300° C.; or
  a modulus at 150 to 300° C. of greater than 1,000 MPa at a 300 micrometer sample thickness measured according to ASTM D5418.

9. The polymer composition of claim 1, wherein the polyisoindolinone further has at least one of the following properties:
  less than 25 parts per million by weight of benzylic protons of the polyisoindolinone;
  a hydroxyl polymer end group content of less than 700 parts per million by weight of the polyisoindolinone;
  a halogen content of less than 900 parts per million by weight of the polyisoindolinone;
  a residual alkali or alkaline earth metal cation content of less than 500 parts per million by weight of the polyisoindolinone;
  a residual solvent content of less than 500 parts per million by weight of the polyisoindolinone.

10. The polymer composition of claim 1, wherein the polyisoindolinone further has at least one of the following properties:
  a weight average molecular weight of at least 15,000 Daltons;
  an onset decomposition temperature of greater than 485° C. as determined using thermogravimetric analysis in nitrogen;
  a coefficient of thermal expansion of 30-90 ppm/° C. as determined according to ASTM E831;
  greater than 10% crystallinity, as determined using differential scanning calorimetry on the second heat cycle, wherein heating and cooling is at a rate of 20° C./minute for both heating and cooling cycles.

11. The polymer composition of claim 1, wherein the polyisoindolinone has the following properties:
  a 300 micrometer-thick film of the polyisoindolinone has at least 70% transmission at 850 nm, 1310 nm, or 1550 nm as measured on an ultraviolet-visible/near infrared spectrophotometer; or
  a 300 micrometer-thick film sample has greater than 70% transmission as measured using the color space CIE1931 (Illuminant C and a 2° observer).

12. The polymer composition of claim 1, wherein the polyisoindolinone further has at least one of the following properties:
- a water uptake of less than 3 percent at 23° C., after 24 hours by direct immersion;
- a shift in melt viscosity of less than 30% over 30 min at 380° C. under a nitrogen atmosphere as measured in a small amplitude oscillatory time sweep rheology at a fixed angular frequency of 10 radians/second; or
- a char yield of greater than 30 weight percent, as determined using thermogravimetric analysis under inert atmosphere of nitrogen.

13. The polymer composition of claim 1, wherein a melt-pressed film of the polyisoindolinone can be folded 180 degrees greater than 3 times without breaking after autoclaving for 3 days at 130° C.

14. The polymer compositions of claim 1, wherein the polyisoindolinone comprises up to 99 mole percent of the arylene ether ketone units.

15. The polymer composition of claim 1, wherein in the polyisoindolinone
$R^2$ is a $C_{6-30}$ substituted or unsubstituted arylene of the formula

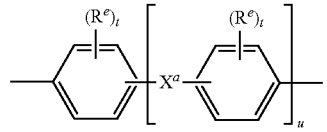

wherein
- each $R^e$ is independently the same or different, and is $C_{1-12}$ alkyl, $C_{2-6}$ alkenyl, $C_{3-6}$ cycloalkyl, or $C_{1-6}$ alkoxy,
- each t is independently the same or different, and is an integer of 0-4,
- each u is independently the same or different, and is an integer of 0-4, and
- $X^a$ is a single bond, —O—, —S—, —S(=O)—, —S(=O)$_2$—, —C(=O)—, —P(R)(=O)— wherein R is a $C_{1-8}$ alkyl or $C_{6-12}$ aryl, or a $C_{1-18}$ organic bridging group.

16. The polymer composition of claim 1, wherein $R^2$ is derived from a compound that is p-hydroquinone, methyl hydroquinone, dimethyl hydroquinone, tert-butyl hydroquinone, di-tert-butyl hydroquinone, resorcinol, 4,4'-biphenol, 4,4'-dihydroxydiphenyl ether, 4,4'-isopropylidenediphenol, 4,4'-(hexafluoroisopropylidene)diphenol, bis(3,5-dimethyl-4-hydroxyphenyl)isopropylidene, bis(4-hydroxyphenyl) sulfoxide, bis(4-hydroxyphenyl) sulfone, bis(4-hydroxyphenyl) sulfide, bis(3,5-dimethyl-4-hydroxyphenyl) sulfone, 4,4'-(1-phenylethylidene)bisphenol, 4,4'-dihydroxybenzophenone, 1,4-bis-(p-hydroxybenzoyl)benzene, 1,3-bis-(p-hydroxybenzoyl)benzene, or a combination thereof.

17. The polymer composition of claim 1, wherein
$R^1$ is hydrogen, $C_{1-6}$ alkyl, $C_{3-6}$ cycloalkyl, or phenyl optionally substituted with 1-3 $C_{1-6}$ alkyl groups;
$R^a$ is $C_{1-4}$ alkyl;
each $R^b$ is independently the same or different, and is $C_{1-6}$ alkyl, $C_{2-6}$ alkenyl, $C_{3-6}$ cycloalkyl, or $C_{1-6}$ alkoxy;
each $R^c$ is independently the same or different, and is $C_{1-6}$ alkyl, $C_{2-6}$ alkenyl, $C_{3-8}$ cycloalkyl, or $C_{1-12}$ alkoxy;
each $R^e$ is independently the same or different, and is $C_{1-6}$ alkyl, $C_{2-6}$ alkenyl, $C_{3-6}$ cycloalkyl, or $C_{1-6}$ alkoxy;
each p, q, r, and t is independently the same or different, and is an integer of 0 or 1;
each u is independently the same or different, and is 0 or 1; and
each x is independently the same or different, and is an integer of 1-4.

18. The polymer composition of claim 1, further comprising an additive, a particulate filler, a reinforcing agent, or a combination comprising at least one of the foregoing.

19. An article comprising the polymer composition of claim 1.

20. A method of forming the article claim 19, comprising shaping, extruding, molding, or injection molding the polymer composition.

* * * * *